US010454757B2

(12) United States Patent
Machida et al.

(10) Patent No.: US 10,454,757 B2
(45) Date of Patent: Oct. 22, 2019

(54) CONTROL APPARATUS, STORAGE APPARATUS, AND NON-TRANSITORY COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventors: Tatsuhiko Machida, Kawasaki (JP); Shoji Oshima, Kawasaki (JP); Hirokazu Matsubayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 15/658,453

(22) Filed: Jul. 25, 2017

(65) Prior Publication Data

US 2018/0041381 A1 Feb. 8, 2018

(30) Foreign Application Priority Data

Aug. 5, 2016 (JP) ................. 2016-154247

(51) Int. Cl.
*H04L 12/24* (2006.01)
*H04L 12/707* (2013.01)

(52) U.S. Cl.
CPC ...... *H04L 41/0659* (2013.01); *H04L 41/0663* (2013.01); *H04L 41/0695* (2013.01); *H04L 45/22* (2013.01)

(58) Field of Classification Search
CPC ............. G06F 13/1668; G06F 13/1689; G06F 13/4027; G06F 13/4068; G06F 13/405;
(Continued)

(56) References Cited

U.S. PATENT DOCUMENTS 5,720,028 A 2/1998 Matsumoto et al.
2003/0137933 A1* 7/2003 Yamada .............. H04L 12/5601
370/225
(Continued)

FOREIGN PATENT DOCUMENTS

JP 2004-341982 12/2004
JP 2005-122763 5/2005
(Continued)

*Primary Examiner* — Hoang-Chuong Q Vu
(74) *Attorney, Agent, or Firm* — Fujitsu Patent Center

(57) ABSTRACT

A control apparatus receives information on an abnormality in a relay apparatus including first and second monitor units provided in the relay apparatus to relay a communication among control apparatuses, from the first monitor unit to manage first information and execute a monitor of the relay apparatus, the abnormality being detected by the first monitor unit; and when the received information is information on an abnormality of a bridge unit to form a first communication route between the first monitor unit and the second monitor unit to manage second information and execute a monitor of the relay apparatus, executes a process for switching a communication route used to synchronize the first and second information between the first and second monitor unit, from the first communication route via the bridge unit, to a second communication route via communication lines connecting the control apparatus and the first and second monitor units.

19 Claims, 15 Drawing Sheets

(58) Field of Classification Search
CPC .......... H04L 41/0659; H04L 41/0663; H04L 41/0695; H04L 45/22
See application file for complete search history.

(56) References Cited

U.S. PATENT DOCUMENTS

| | | | |
|---|---|---|---|
| 2004/0153897 A1* | 8/2004 | Ukon .................... | H04J 3/0688 714/701 |
| 2007/0070975 A1 | 3/2007 | Otani et al. | |
| 2007/0230083 A1* | 10/2007 | Takakuwa ................ | H04J 3/14 361/119 |
| 2008/0052473 A1 | 2/2008 | Yagi et al. | |
| 2015/0242351 A1* | 8/2015 | Suzuki ................ | G06F 13/4022 710/316 |
| 2015/0280897 A1* | 10/2015 | Kayama ................ | H04L 7/0016 375/356 |
| 2015/0288620 A1* | 10/2015 | Yasuda ................ | H04L 49/552 370/401 |
| 2015/0333954 A1* | 11/2015 | Yasuda ............... | H04L 12/4625 370/227 |
| 2016/0321199 A1* | 11/2016 | Matsubayashi ..... | G06F 13/1668 |
| 2017/0075844 A1* | 3/2017 | Kobayashi .......... | G06F 13/4027 |
| 2017/0237603 A1* | 8/2017 | Imai ..................... | H04L 43/026 370/219 |

FOREIGN PATENT DOCUMENTS

| | | |
|---|---|---|
| JP | 2007-087266 | 4/2007 |
| JP | 2008-033588 | 2/2008 |

* cited by examiner

FIG. 5

EXAMPLES OF OPERATION MODES

| OPERATION MODE | MONITORED BY | INTER-SVC PATH | SYNCHRONIZATION OF INTER-SVC INFORMATION | MODE SWITCHING CONDITION | DESCRIPTION |
|---|---|---|---|---|---|
| MASTER SVC MONITOR MODE | MASTER SVC | MP BRIDGE | SYNCHRONIZATION BETWEEN SVCS | DURING NORMAL OPERATION | MODE WHEN NORMAL |
| SVC INDEPENDENT OPERATION MODE | MASTER CM | CM | SYNCHRONIZATION BETWEEN SVC AND CM | UPON FAILURE OF MP BRIDGE | OPERATE REDUNDANTLY WITHOUT DEGENERATION OF OTHER COMPONENTS |

FIG. 6

EXAMPLES OF EVENT OPERATIONS FOR EACH OPERATION MODE

| OPERATION MODE | NOTIFICATION OF SVC DETECTION EVENT TO CM | OBTAINMENT OF INFORMATION MANAGED BY SVC | CONTROL INSTRUCTION FROM CM TO SVC |
|---|---|---|---|
| MASTER SVC MONITOR MODE | NOTIFIED BY MASTER SVC TO MASTER CM | REQUESTED BY MASTER CM TO MASTER SVC | INSTRUCTED FROM MASTER CM TO CONTROL-TARGET SVC VIA MASTER SVC |
| SVC INDEPENDENT OPERATION MODE | NOTIFIED BY DETECTING SVC TO MASTER CM | REQUESTED BY MASTER CM TO EACH SVC | INSTRUCTED FROM MASTER CM TO EACH SVC |

FIG. 9

EXAMPLE OF CONFIGURATION INFORMATION

| UNIT | STATUS |
| --- | --- |
| MP BRIDGE | online |
| MP#0 | online |
| MP#1 | online |
| MP-EXT#0 | online |
| MP-EXT#1 | online |
| MP-PSU#0 | online |
| MP-PSU#1 | online |
| FRT#0 | online |
| FRT#1 | online |
| FRT#2 | online |
| FRT#3 | online |
| SVC#0 | online |
| SVC#1 | online |
| FANU#0 | online |
| FANU#1 | online |
| FANU#2 | online |
| FANU#3 | online |
| PSU#0 | online |
| PSU#1 | online |
| PSU#2 | online |
| PSU#3 | online |
| ⋮ | ⋮ |

CONTROL APPARATUS, STORAGE APPARATUS, AND NON-TRANSITORY COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2016-154247, filed on Aug. 5, 2016, the entire contents of which are incorporated herein by reference.

FIELD

The present disclosure relates to a control apparatus, a storage apparatus, and a non-transitory computer-readable recording medium having stored therein a control program.

BACKGROUND

In a storage apparatus, improvements in the availability and the performance of the system can be achieved by providing pluralities of similar devices, cables, and the like, to give redundancy to control apparatuses that execute access controls between a host and a storing device, paths between the control apparatus and the storing device, and the like, for example.

Furthermore, a storage apparatus provided with multiple control apparatuses, e.g., controller modules (CMs), may include a switch unit for communications among those CMs. A plurality of such switch units may also be provided to give redundancy for improving the availability and the performance of the system, and may be connected to a back panel of a storage apparatus, for example.

Patent Document 1: Japanese Laid-open Patent Publication No. 2004-341982
Patent Document 2: Japanese Laid-open Patent Publication No. 2008-33588
Patent Document 3: Japanese Laid-open Patent Publication No. 2005-122763

In a storage apparatus as described above, because no redundancy is given to a back panel, any failure of the back panel may cause a suspension of operations of the storage apparatus. After power supply to the entire storage apparatus is cut off, replacement of the back panel is done, for example.

As described above, the availability may decrease in a storage apparatus provided with multiple control apparatuses.

SUMMARY

According to an aspect of the embodiments, a control apparatus for one of a plurality of control apparatuses configured to control accesses to a plurality of storage devices is disclosed. The control apparatus includes a memory; and a processor coupled to the memory, and the processor is configured to: receive information on an abnormality in a relay apparatus including first and second monitor units provided in the relay apparatus configured to relay a communication among the plurality of control apparatuses, from the first monitor unit configured to manage first management information and execute a monitor of the relay apparatus, the abnormality being detected by the first monitor unit; and when the received information about the abnormality is information on an abnormality of a bridge unit configured to form a first communication route between the first monitor unit and the second monitor unit configured to manage second management information and execute a monitor of the relay apparatus, execute a switching process for switching a communication route used to synchronize the first and second management information between the first monitor unit and the second monitor unit, from the first communication route via the bridge unit, to a second communication route via communication lines connecting the control apparatus and either of the first and second monitor units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram depicting examples of operation modes of a monitor control;
FIG. 6 is a diagram depicting an exemplary event operation of the respective operation modes of a monitor control;
FIG. 9 is a diagram depicting one example of configuration information managed by the CMs.

DESCRIPTION OF EMBODIMENTS

Figure 1:
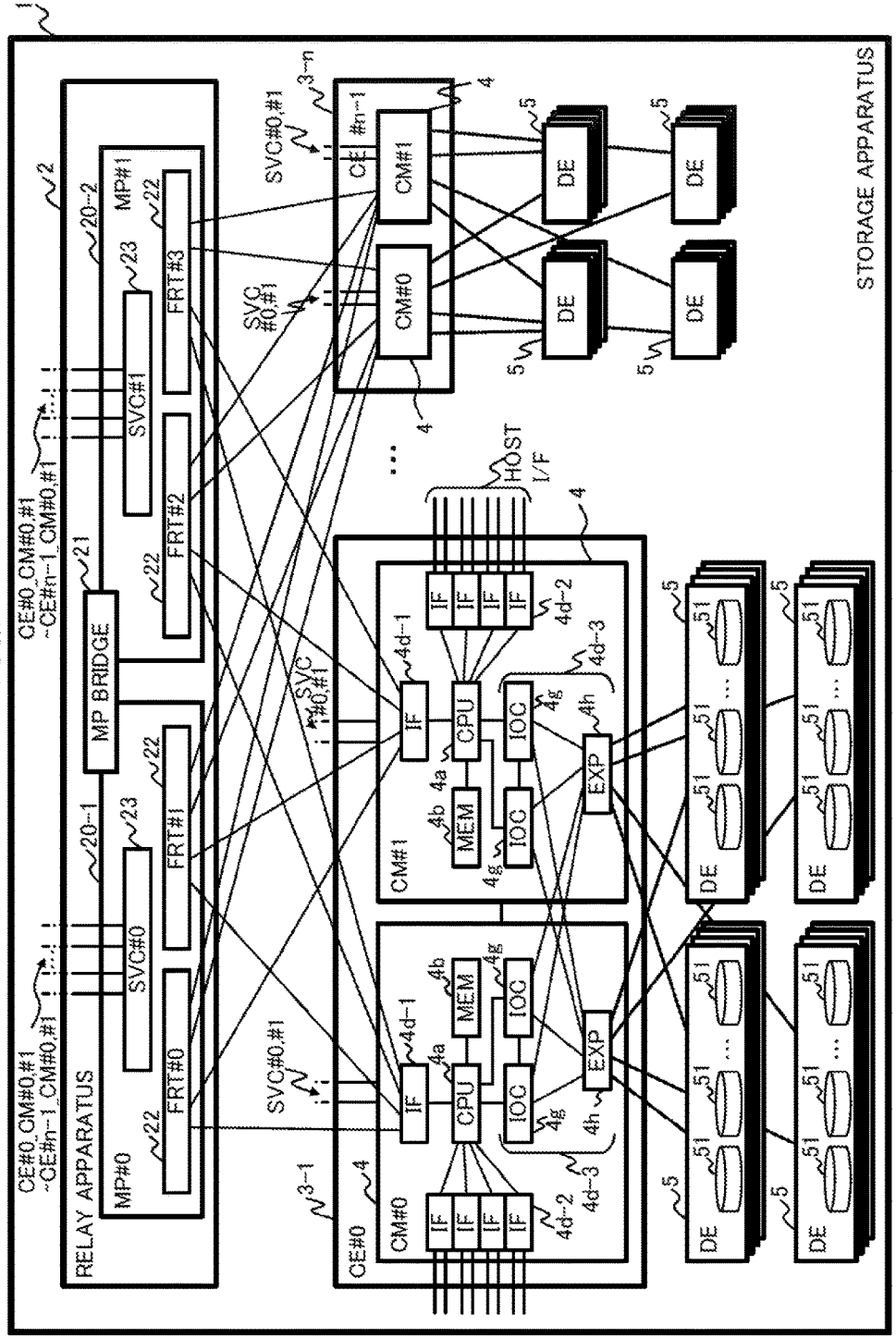
FIG. 1 is a block diagram depicting an exemplary configuration of a storage apparatus in accordance with one embodiment.

Hereinafter, an embodiment of the present disclosure will be described with reference to the drawings. An embodiment described below, however, is merely exemplary, and it is not intended to exclude a wide variety of modifications to and applications of the technique which are not explicitly described below. In other words, the present embodiment may be practiced in a wide variety of modifications without departing from the spirit thereof. Note that, in the drawings referenced to in the descriptions below, elements denoted as like reference symbols may denote the same or similar elements, unless otherwise stated.

(1) One Embodiment

(1-1) Exemplary Configuration of Storage Apparatus

FIG. 1 is a block diagram depicting an exemplary configuration of a storage apparatus 1 in accordance with one embodiment. As depicted in FIG. 1, the storage apparatus 1 may include a relay apparatus 2, one or more (n in FIG. 1, n is a natural number) controller enclosures (CEs) 3-1 to 3-$n$, and multiple drive enclosures (DEs) 5, for example. In the following descriptions, the CEs 3-1 to 3-$n$ are simply denoted as the CEs 3 when no distinction is to be made among them. The CEs 3-1 to 3-$n$ may also be denoted as the CE #0 to the CE #n−1, respectively. The relay apparatus 2 may be a front-end enclosure (FE), for example.

The storage apparatus 1 has multiple storing devices 51 enclosed in the DEs 5 to provide a host apparatus (not illustrated) with storage areas in the storing devices 51. For example, the storage apparatus 1 may store data in the multiple storing devices 51 in a distributed or redundant manner using Redundant Arrays of Inexpensive Disks (RAID). Note that the CEs 3 may have the storing device 51 inside the CEs 3.

Each CE 3 is connected to the relay apparatus 2 and the DEs 5, and represents one example of a control casing that executes various controls. Each CE 3 may include multiple (two in FIG. 1) CMs 4, for example. In the following descriptions, the CMs 4 in each CE 3 may be denoted as the CM #0 or the CM #1. Note that the CEs 3-1 to 3-$n$ may have similar configurations, and one CM 4 may have a similar configuration as that of the other CM 4. Accordingly, the CE 3 and the CM 4 will be described with reference to the CE 3-1 (and the CMs 4) depicted in FIG. 1 as an example.

Each CM 4 represents one example of a control apparatus (controller) or an information processing apparatus (computer) which controls accesses from an unillustrated host apparatus to the multiple storing devices 51.

In the example in FIG. 1, each CM 4 in accordance with one embodiment defines a redundant configuration (e.g., is duplicated) with the other CM 4 in the CE 3. These CMs 4 may be connected through cables compliant with the Small Computer System Interface (SCSI), e.g. the Serial Attached SCSI (SAS), for example. In the example in FIG. 1, each CM 4 in each CE 3 is connected to the DE 5 corresponding to that CE 3 directly or indirectly, to give redundancy to the access routes.

Further, in one embodiment, the multiple CMs 4 in the storage apparatus 1 may include a master CM 4. The master CM 4 executes various controls for the storage apparatus 1 in accordance with a request from the host apparatus, the relay apparatus 2, the other CM 4 (slave CM 4), or the like.

Further, the multiple CMs 4 in the storage apparatus 1 (the master CM 4 and the slave CM 4) communicate with each other (hereinafter, such communications are referred to as inter-CM communications). Inter-CM communications enable the multiple CMs 4 to carry out sharing (synchronizations) or notifications of information on controls of the storage apparatus 1, accesses to the multiple storing devices 51, and the like. The details of the CM 4 will be described later.

Each DE 5 may include multiple storing devices 51, and may carry out various accesses to the storing devices 51, such as writes and reads of data, in response to a request from a CE 3 (a CM 4). Four DEs 5 are grouped (bundled) in the example in FIG. 1, and these grouped four DE 5 are illustrated as being connected in a cascade (tandem connection).

Each storing device 51 represents one example of hardware that stores various data and programs and the like. Examples of the storing devices 51 include a wide variety of storing devices, such as magnetic disk devices, e.g., hard disk drives (HDDs), and semiconductor drive devices, e.g., solid state drives (SSDs).

The relay apparatus 2 represents one example of an apparatus that is connected to the multiple CMs 4 to relay communications among the CMs 4 (e.g., relay information transmitted and received among the CMs 4). The relay apparatus 2 may include multiple redundant (two in FIG. 1) midplanes (MP) 20-1 and 20-2, and an MP bridge 21 that connects the MPs 20-1 and 20-2, for example. In the following descriptions, the MPs 20-1 and 20-2 are simply denoted as the MPs 20 when no distinction is to be made among them.

Each MP 20 may include multiple redundant (two in FIG. 1) front end routers (FRTs) 22 and a service controller (SVC) 23, for example.

Each FRT 22 represents one example of a connection unit that communicatively connects the multiple CMs 4. Each FRT 22 includes multiple adaptors compliant with the Peripheral Component Interconnect (PCI), e.g., the PCI Express (PCIe), for example, and is connected to the respective CMs 4 cables compliant with the PCIe and the like.

Each SVC 23 represents one example of a monitor unit or information processing apparatus (computer) that manages management information 233$a$ (refer to FIG. 4), and executes a monitor of the relay apparatus 2. Each SVC 23 is also capable of controlling the multiple CEs 3, such as turning on or off a power supply.

Each SVC 23 may include multiple interfaces for connecting to the CMs 4, for example, and may be connected to each of the multiple CMs 4 through cables and the like. In the example in FIG. 1, communication lines on the side of the SVCs 23 denoted as "CE #0_the CM #0, #1 to CE #n−1_the CM #0, #1" and indicated by solid lines are connected to communication lines on the side of the CMs 4 denoted as "SVC #0, #1" and indicated by solid lines, to connect the SVCs 23 and each of the multiple CMs 4. Note that each SVC 23 may carry out monitors and power supply controls for other components in the storage apparatus 1.

Further, in one embodiment, the multiple SVCs 23 in the relay apparatus 2 may include a master SVC 23 that takes the initiative to carry out monitors, power supply controls, and the like for the storage apparatus 1 described above. The master SVC 23 may carry out communications with the CMs 4 and the like. When an abnormality arises in the master SVC 23, the other SVC 23 (slave SVC 23) may be promoted to the master SVC 23 to take over monitors, power supply controls, and the like for the storage apparatus 1 described above.

The MP bridge 21 represents one example of a bridge unit that communicatively connects the multiple MPs 20. Each SVC 23 may carry out a monitor of a remote group (e.g., the other MP 20 and modules connected to that MP 20) via the MP bridge 21. The details of the relay apparatus 2 will be described later.

Note that the storage apparatus 1 may include a rack (not illustrated) for mounting the relay apparatus 2, the CEs 3, and the DEs 5 described above, for example, and the relay apparatus 2, the CEs 3, and the DEs 5 may be detachably mounted to that rack.

The above-described configuration enables the CMs 4 to communicate with the other CM 4 via any of the FRTs 22 in the multiple MPs 20 in the storage apparatus 1 in accordance with one embodiment. In this manner, redundancy of routes for communications among the CMs 4 is given.

Here, as depicted in FIG. 1, no redundancy may be given to the MP bridge 21 due to some reasons, such as higher costs and limited mounting space. Therefore, when an abnormality (e.g., a malfunction) arises in the MP bridge 21, for example, a communication between the MPs 20-1 and 20-2 fails and making a confirmation of the respective states may become difficult between the master SVC 23 and the slave SVC 23.

To address a failure of the MP bridge 21, for example, when an abnormality arises in the MP bridge 21, it is regarded that the master SVC 23 and the CMs 4 cooperate to detach (degenerate) the remote group in the relay apparatus 2, thereby achieving a continuous operation of the system.

The continuous operation, however, is achieved by degrading the remote group while the duplicated configuration of the relay apparatus 2 is not maintained anymore. When an abnormality arises in a module in the local group (on the master side) operating while the remote group is degraded, the storage apparatus 1 may go down, for example.

Further, in a continuous operation while the duplicated configuration is not maintained anymore, although fans and power supplies on the degraded side are isolated from a viewpoint of firmware, they are still active from a viewpoint of hardware. In other words, the fans and the power supplies on the degraded side are active in the absence of the SVC 23 as a monitor module. Therefore, when an abnormality is detected in any of the fans and the power supplies on the degraded side, the relay apparatus 2 is difficult to detect the abnormality and the storage apparatus 1 may go down as a result.

For the above reasons, in the storage apparatus 1 in accordance with one embodiment, when the MP bridge 21 becomes abnormal and the access paths for inter-system communications in the relay apparatus 2 are disconnected, a process of a monitor control executed between the SVCs 23 via the MP bridge 21 is processed between the CM 4s and each SVC 23.

Hereinafter, an operation mode of a monitor control process executed between the SVCs 23 via the MP bridge 21 under the initiative of the master SVC 23 is referred to as the "master SVC monitor mode", whereas an operation mode of a monitor control process executed between the CM 4s and each SVC 23 is referred to as the "SVC independent operation mode". Note that the details of the master SVC monitor mode and the SVC independent operation mode will be described later.

As described above, in accordance with one embodiment, when the MP bridge 21 is abnormal, the operation mode of a monitor control is switched from the master SVC monitor mode to the SVC independent operation mode. As a result, a continuous operation is made possible while the redundancy of the modules in the relay apparatus 2 is maintained, thereby improving the reliability of the storage apparatus 1.

(1-2) Exemplary Hardware Configuration With Regard to Relay Apparatus 2

Figure 2:
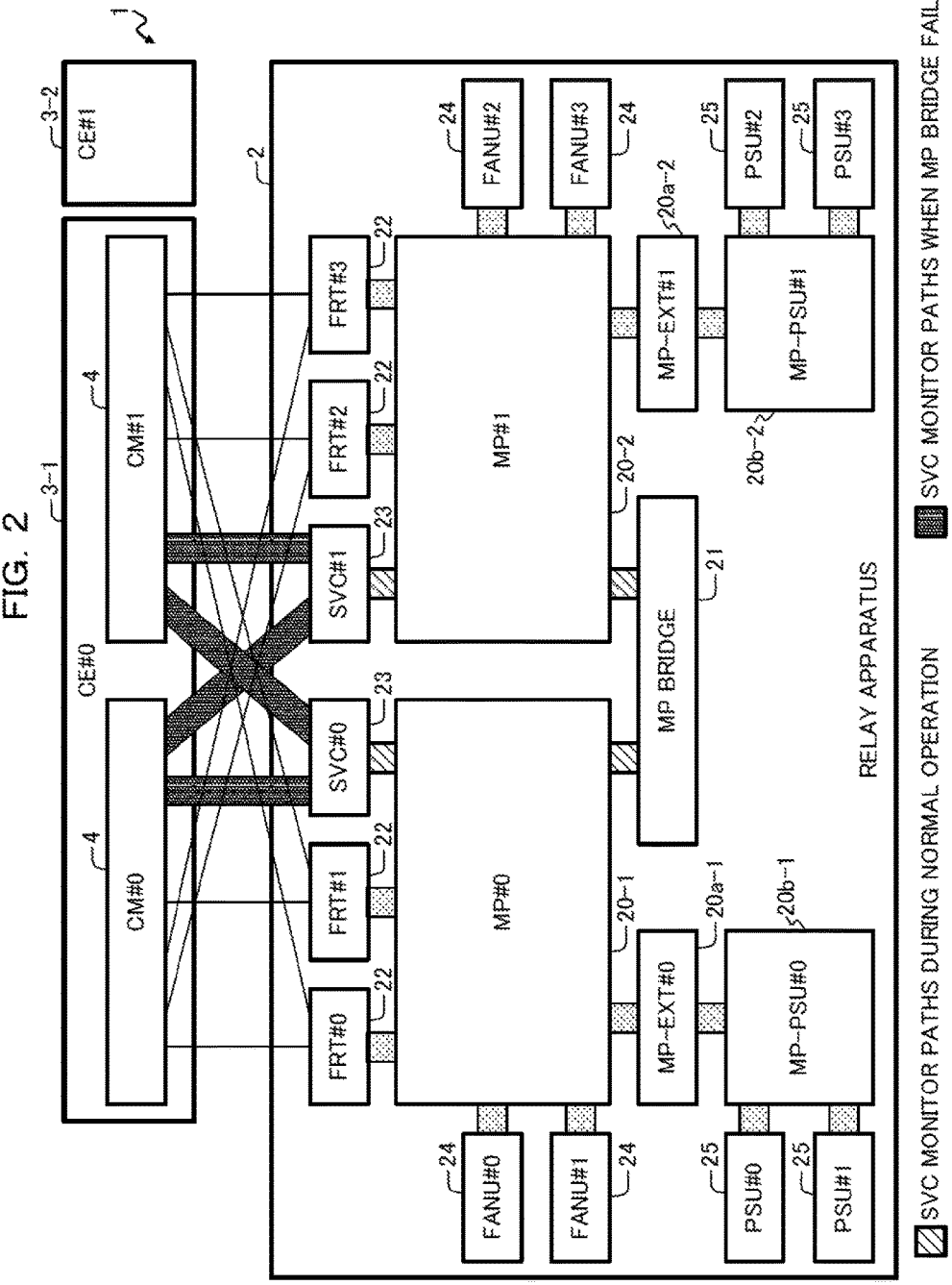
FIG. 2 is a block diagram depicting an exemplary configuration of a relay apparatus depicted in FIG. 1.

Next, referring to FIGS. 2 and 3, an exemplary hardware configuration of the relay apparatus 2 depicted in FIG. 1 will be described. As depicted in FIG. 2, the relay apparatus 2 may include the two MPs 20-1 and 20-2 (#0 and #1), the MP bridge 21, the four FRTs 22 (#0 to #3), and the two SVCs 23 (#0 and #1) described above, for example. The relay apparatus 2 may also include two MP-EXTs 20a-1 and 20a-2 (#0 and #1), and two MP-PSUs 20b-1 and 20b-2 (#0 and #1). The relay apparatus 2 may further include four fan units (FANUs) 24 (#0 to #3), and four power supply units (PSUs) 25 (#0 to #3).

In the following descriptions, #0 to #3 may be used for specifying a particular unit provided in the relay apparatus 2 (each block exemplified in FIG. 2) in place of reference symbols, and the MPs 20-1 and 20-2 may be denoted as the MP #0 and the MP #1, respectively for example. Furthermore, the MP-EXTs 20a-1 and 20a-2 may be simply denoted as the MP-EXTs 20a, and the MP-PSU 20b-1 and 20b-2 may be simply denoted as the MP-PSUs 20b. Note that the "units" may be exchangeable components, and may be referred to as "modules".

Further, in the following descriptions, modules, such as the MP #0, the MP-EXT 20a-1, the MP-PSU 20b-1, the FRT #0, the FRT #1, the SVC #0, the FANU #0, the FANU #1, the PSU #0, and the PSU #1, may be denoted as the "#0 group". The "#0 group" may also be referred to as "#0 system". Similarly, modules, such as the MP #1, the MP-EXT 20a-2, the MP-PSU 20b-2, the FRT #2, the FRT #3, the SVC #1, the FANU #2, the FANU #3, the PSU #2, and the PSU #3, may be denoted as the "#1 group". The "#1 group" may also be referred to as "#1 system". In other words, each of the #0 group and the #1 group represents one example of a module group including multiple modules including an FRT 22 as one example of a connection unit and an SVC 23 as one example of a monitor unit.

Note that a CM #0 and a CM #1 in the respective CEs 3 may be handled by relating them to the #0 group and the #1 group in the relay apparatus 2, respectively.

In the example depicted in FIG. 2, hatched or light mesh rectangles between units indicate that those units are communicatively connected through connectors. Furthermore, solid lines or dark mesh rectangles between units indicate that those units are communicatively connected through connectors or cables.

For example, in FIG. 2, the hatched rectangles indicate monitor paths for the SVCs 23 during a normal operation in the master SVC monitor mode, and the rectangles in dark mesh indicate monitor paths for the SVCs 23 when the operation mode is switched to the SVC independent operation mode after the MP bridge 21 fails. While not illustrated in FIG. 2, the relay apparatus 2 may be connected to a CE 3 other than the CE #0 (e.g., the CE #1), in the manner similar to the connections with the CE #0.

Each MP 20 may be a board-type device (board unit), for example. As exemplified in FIG. 2, an MP-EXT 20a, the MP bridge 21, FRTs 22, an SVC 23, and FANUs 24 may be communicatively connected to each of the MPs 20 in the #0 group and the #1 group through connectors.

Each MP-EXT 20a may be communicatively connected to the MP 20 and the MP-PSU 20b, and may relay signals and the like transmitted and received with the MP 20 and the MP-PSU 20b, for example. Each MP-PSU 20b may be communicatively connected to the MP-EXT 20a and the PSU 25, for example. Note that the MP-EXT 20a and the MP-PSU 20b may be devices in the form of board.

The MP bridge 21 may communicatively connect the above-described components in the two groups (i.e., the #0 group and the #1 group) in the relay apparatus 2. For example, the MP bridge 21 may include an adaptor that is insertable to a connector of the MP #0 and an adaptor that is insertable to a connector of the MP #1, and may be a unit in which those adaptors are connected through on-board wiring, cables, or the like.

Each FANU 24 represents one example of a cooling mechanism that cools each unit in the relay apparatus 2. For example, each FANU 24 may include one or more fans, and can reduce the temperature inside the relay apparatus 2 by generating airflow passing through the relay apparatus 2.

Each PSU 25 represents one example of an electric power supply mechanism that supplies electric power to each unit in the relay apparatus 2. For example, each PSU 25 may supply electric power to the units 22-24 via the MP-PSU 20b, the MP-EXT 20a, and the MP 20.

Each SVC 23 may carry out monitors, controls, and the like for the MP 20, the MP-EXT 20a, the MP-PSU 20b, the FRTs 22, the FANUs 24, and the PSUs 25 in the local group. The SVC 23 may also carry out monitors, controls, and the like for the MP 20 and via the MP bridge 21 in the local group, and the MP 20, the MP-EXT 20a, the MP-PSU 20b, the FRTs 22, the SVC 23, the FANUs 24, and PSUs 25 in the remote group. An exemplary functional configuration of the SVC 23 will be described with reference to FIG. 4.

Figure 3:
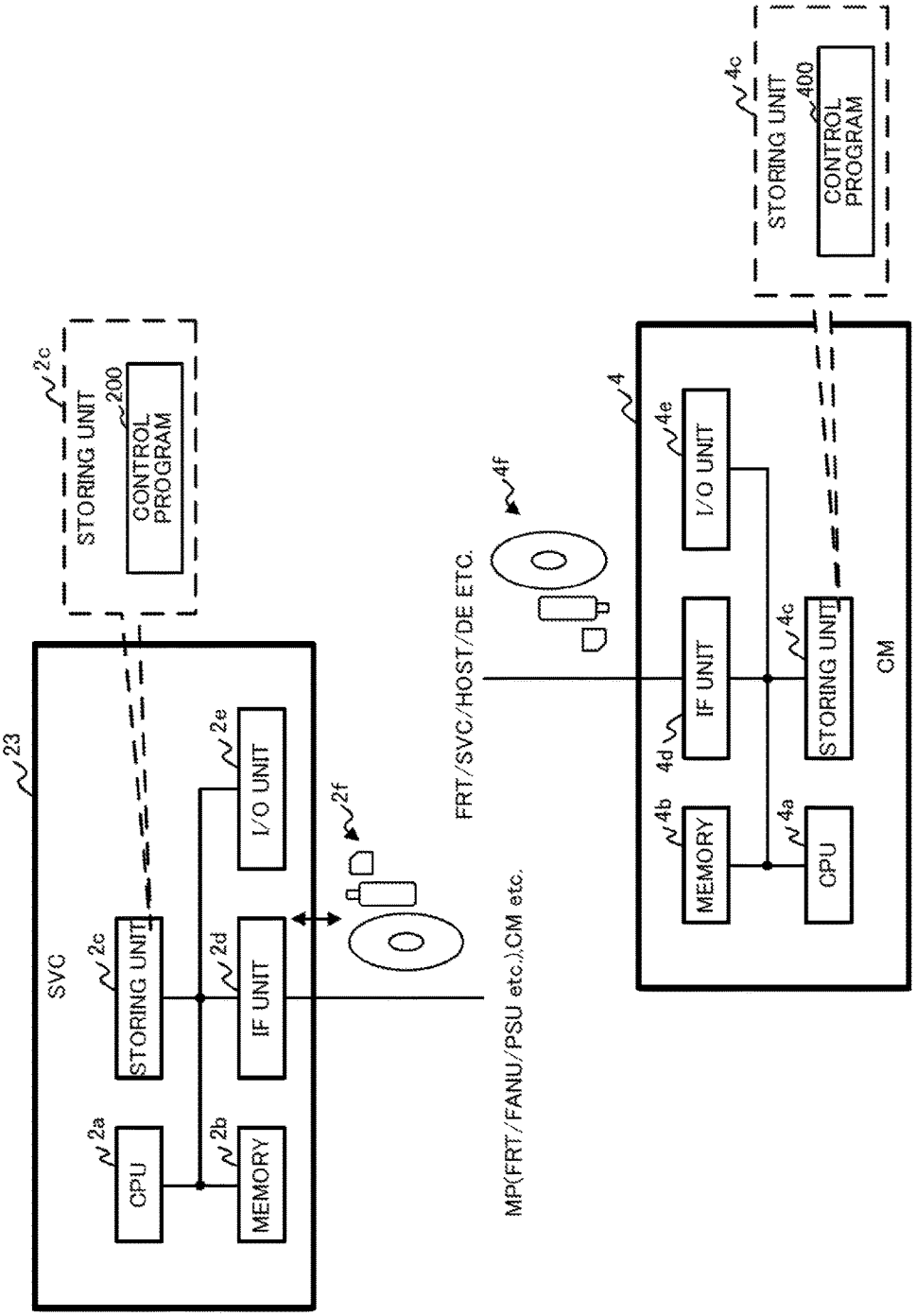
FIG. 3 is a block diagram depicting exemplary hardware configurations of a service controller (SVC) and a CM depicted in FIG. 1.

Each SVC 23 may include a hardware configuration exemplified in FIG. 3. As depicted in FIG. 3, each SVC 23 may include a central processing unit (CPU) 2a, a memory 2b, a storing unit 2c, an interface (IF) unit 2d, and an input/output (I/O) unit 2e, for example.

The CPU 2a represents one example of a processor that carries out a wide variety of controls and computations. The CPU 2a may be communicatively connected to the blocks 2b-2e through a bus. Note that an electric circuit, such as an integrated circuit (IC), e.g., a micro processing unit (MPU), an application specific integrated circuit (ASIC), a field programmable gate array (FPGA), may be used as the processor, in place of the CPU 2a.

The memory 2b represents one example of hardware that stores information of a wide variety of data and programs. Examples of the memory 2b include a volatile memory, e.g., a random access memory (RAM), for example.

The storing unit 2c represents one example of hardware that stores a wide variety of data, programs, and the like. Examples of the storing unit 2c include a wide variety of storage devices, such as a magnetic disk device, e.g., a HDD; a semiconductor drive device, e.g., an SSD; a non-volatile memory, e.g., a flush memory and a read only memory (ROM); and the like.

For example, the storing unit 2c may store a control program 200 that embodies all or a part of functions of the SVC 23. The CPU 2a can embody the functions of the SVC 23 by expanding the control program 200 stored in the storing unit 2c to the memory 2b and executing it, for example.

The IF unit 2d represents one example of a communication interface that controls connections, communications, and the like, with modules in the local group (e.g., the MP 20, the FRTs 22, the FANUs 24, and the PSUs 25), the CM 4, and a working terminal or the like of an operator. For example, the IF unit 2d may include adaptors for connecting to the MPs 20, multiple interfaces for connections to the CMs 4, an adaptor (port) for connecting the working terminal, and the like. Note that the control program 200 may be downloaded from an unillustrated network to the SVC 23 via the IF unit 2d.

The IF unit 2d may also include a read unit that reads data and programs recorded in a recording medium 2f. The read unit may include a connection terminal or device, to which a non-transitory computer-readable storage medium 2f can be connected or inserted. Examples of the read unit include an adaptor compliant with the Universal Serial Bus (USB) or other standards, a drive device that accesses recording disks, a card reader that accesses a flush memory (e.g., an SD card), for example. Note that the control program 200 may be stored in the storage medium 2f.

Examples of the recording medium 2f and a recording medium 4f described later include non-transitory storage media, such as flexible disks, magnetic/optical disks, and flush memories, for example. Examples of magnetic/optical disks include compact discs (CDs), digital versatile discs (DVDs), Blu-ray® discs, holographic versatile discs (HVDs), and the like, for example. Examples of flush memory include USB memories and SD cards, for example. Note that examples of CDs include CD-ROMs, CD-Rs, CD-RWs, and the like, for example. Further, examples of DVDs include DVD-ROMs, DVD-RAMS, DVD-Rs, DVD-RWs, DVD+Rs, DVD+RWs, and the like, for example.

The I/O unit 2e may include at least one of an input unit (e.g., a mouse, a keyboard, and operation buttons), and output units (e.g., a display). For example, the input unit may be used for a wide variety of operations, e.g., registrations and modifications of setting, selections (switching) of the mode of the system, and tasks of data entries by an operator (user) or the like, and the output unit may be used for confirmation of setting by the operator or the like, outputs of various notifications, and the like.

The above-described hardware configurations of the relay apparatus 2 and the SVCs 23 are exemplary. Accordingly, hardware may be added or removed (e.g., addition or removal of any blocks), may be divided, or may be combined in any combination, or a bus may be added or removed in the relay apparatus 2 and the SVCs 23, where appropriate.

Exemplary Hardware Configuration of CM 4

Next, referring to FIGS. 1 and 3, an exemplary hardware configuration of each CM 4 depicted in FIG. 1 will be described. As depicted in FIG. 3, each CM 4 may include a CPU 4a, a memory 4b, a storing unit 4c, an IF unit 4d, and an I/O unit 4e, for example.

The CPU 4a, the memory 4b, and the storing unit 4c may be similar to the CPU 2a, the memory 2b, and the storing unit 2c, respectively. Note that the memory 4b may be used as a cache memory that temporarily stores data and programs used to access the DEs 5 and the like. Further, the storing unit 4c may store a control program 400 that embodies all or a part of functions of the CM 4. The CPU 4a can embody the functions of the CM 4 by expanding the control program 400 stored in the storing unit 4c to the memory 4b and executing it, for example.

The IF unit 4d represents one example of a communication interface that controls connections, communications, and the like, with the FRTs 22 and the SVCs 23 in the relay apparatus 2, the host apparatus, the DEs 5, the other CM 4 in the CE 3, and a working terminal or the like of an operator. For example, the IF unit 4d may include the IFs 4d-1 to 4d-3 and adaptors (ports) for connecting the working terminal depicted in FIG. 1 and the like. Note that the control program 400 may be downloaded from an unillustrated network to the CM 4 via the IF unit 4d.

In the example depicted in FIG. 1, each IF 4d-1 represents one example of a communication interface that controls connections, communications, and the like, with the relay apparatus 2. Examples of the IFs 4d-1 include non-transparent bridges (NTBs) provided with adaptors compliant with PCIe or any other standard, for example.

Each IF 4d-2 represents one example of a communication interface (host interface) that controls connections, communications, and the like with the host apparatus. Examples of the IFs 4d-2 include channel adapters (CAs) provided with adaptors compliant with a local area network (LAN), Storage Area Network (SAN), Fibre Channel (FC), InfiniBand, or the like, for example. Each IF 4d-2 may be connected to the host apparatus through a cable or the like compliant with any of such standards, or may be via an unillustrated network. In the example in FIG. 1, four IFs 4d-2 are provided in each CM 4.

Each IF 4d-3 represents one example of a communication interface that controls connections, communications, and the like, with the DEs 5 (the storing devices 51). Each IF 4d-3 may include multiple (two in the example in FIG. 1) I/O controllers (IOCs) 4g and an expander (EXP) 4h, for example.

Each IOC 4g represents one example of an I/O control unit that controls accesses (I/Os) to the DEs 5. Further, each EXP 4h represents one example of a module for connecting additional devices (e.g., through an SAS connection) under the CM 4. Each EXP 4h may be connected to the DEs 5 through cables or the like compliant with the SAS.

Note that, in the example in FIG. 1, the multiple IOCs 4g are connected to the EXP 4h in the local CM 4 and to the EXP 4h in the other CM 4 in the CE 3, and these EXPs 4h are connected to the DEs 5 corresponding to that CE 3.

For example, in response to an access request to a DE 5 (storing devices 51) which is input from the host apparatus via an IF 4d-2, a packet is generated by the CPU 4a and the IOC 4g, and is issued to that DE 5 via the EXP 4h. Further, a response from the DE 5 is received by the CPU 4a via the EXP 4h and the IOC 4g, and is returned to the host apparatus via the IF 4d-2.

Referring back to FIG. 3, the IF unit 4d may include a read unit that reads data and programs recorded in the recording medium 4f. The read unit may be similar to read unit provided in the IF unit 2d in the SVC 23 described above.

The I/O unit 4e may include at least one of an input unit (e.g., a mouse, a keyboard, and operation buttons), and an output unit (e.g., a display). For example, the input unit may be used for a wide variety of operations, e.g., registration and modification of setting, mode selections (switching) of the system, and tasks of data entries by an operator (user) or the like, and the output unit may be used for confirmation of setting by the operator or the like, outputs of a wide variety of notifications, and the like.

The above-described hardware configuration of the CMs 4 is exemplary. Accordingly, hardware may be added or removed (e.g., addition or removal of any blocks), may be divided, or may be combined in any combination, or a bus may be added or removed in the CMs 4.

(1-3) Exemplary Functional Configuration
About SVC 23

Figure 4:
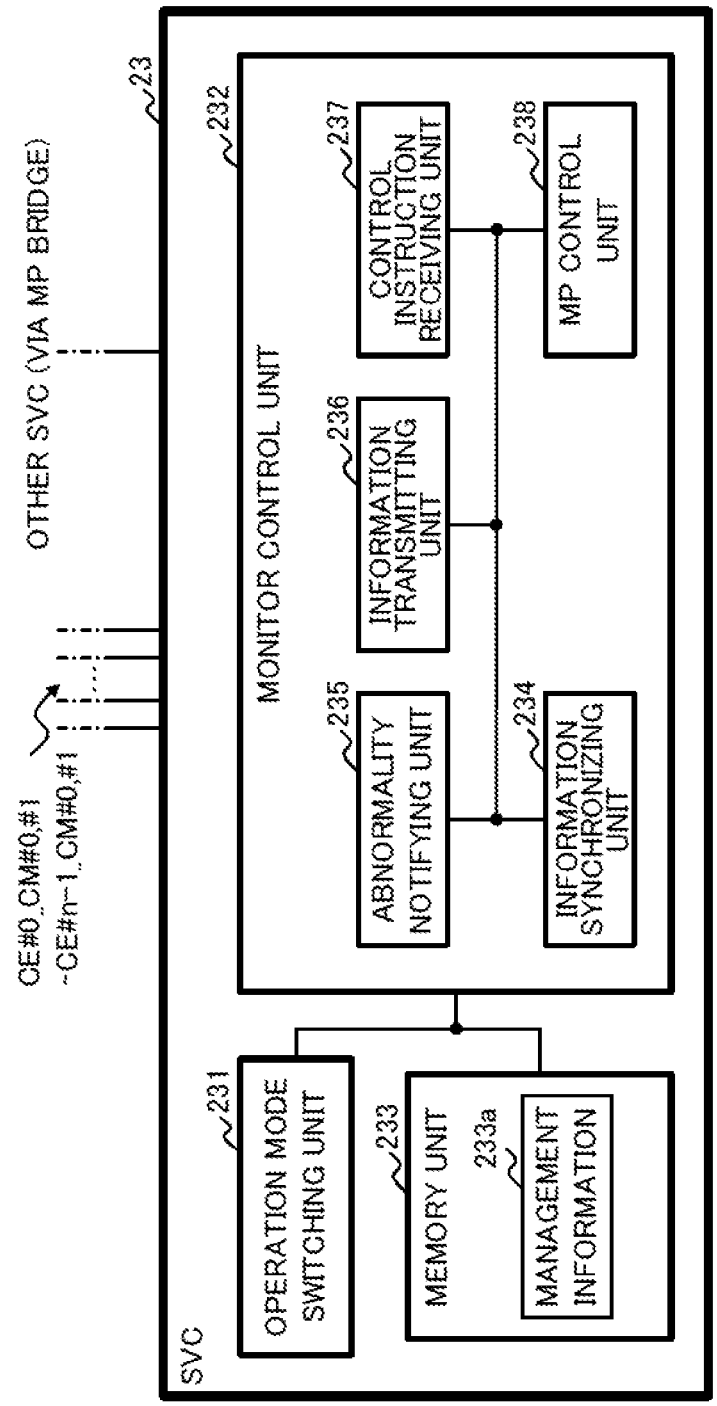
FIG. 4 is a block diagram depicting an exemplary functional configuration for a monitor control process of the SVC depicted in FIGS. 1 and 2.

Next, referring to FIG. 4, an exemplary functional configuration of the SVCs 23 in accordance with one embodiment will be described. FIG. 4 is a block diagram depicting an exemplary functional configuration for a monitor process of the SVCs 23 depicted in FIG. 2.

As depicted in FIG. 4, each SVC 23 may include an operation mode switching unit 231, a monitor control unit 232, and a memory unit 233, for example. The functions of the operation mode switching unit 231 and the monitor control unit 232 may be embodied by the control program 200 executed by the CPU 2a.

The operation mode switching unit 231 switches operation modes of a monitor control process between the master SVC monitor mode and the SVC independent operation mode in response to an instruction from a CM 4. Note that the current operation mode may be stored in setting information stored in the memory 2b in the SVC 23 or the like, and the operation modes may be switched by updating the setting information, for example.

Examples of operation modes are depicted in FIG. 5. As exemplified in FIG. 5, the master SVC monitor mode is the mode in which the master SVC 23 takes the initiative in the monitor, and synchronizes the information mode between the master SVC 23 and the slave SVC 23 using a first communication route via the MP bridge 21. The master SVC monitor mode is the operation mode upon a normality when no malfunction arises in the MP bridge 21, for example.

The SVC independent operation mode is the information mode in which the master CM 4 takes the initiative in the monitor, and executes a synchronization between the SVC 23 and the CMs 4 using the second communication route via communication lines connecting the master CM 4 and the master or slave SVC 23. The SVC independent operation mode is the operation mode to which a transition is made when a malfunction arises in the MP bridge 21, for example. In the SVC independent operation mode, because a synchronization of information can be continued between the SVCs 23 using the route via the master CM 4 in place of the MP bridge 21, it is possible to continue a redundant operation of the #0 group and the #1 group without degrading other components even when the MP bridge 21 fails.

The operation of the monitor control unit 232 changes as depicted in FIG. 6 in accordance with the operation mode of a monitor control switched by the operation mode switching unit 231.

As one example, as depicted in FIG. 6, in the master SVC monitor mode, information on an event detected at the SVC 23 (e.g., information on a failure) is notified from the master SVC 23 to the master CM 4. In contrast, in the SVC independent operation mode, the SVC 23 detecting the information makes a notification directly to the master CM 4 bypassing the master SVC 23 and the MP bridge 21.

Further, as depicted in FIG. 6, when the master CM 4 obtains information managed by the SVC 23 (e.g., management information 233a described below), in the master SVC monitor mode, the master CM 4 requests the master SVC 23 to transmit the management information 233a. In contrast, in the SVC independent operation mode, the master CM 4 requests each SVC 23 (e.g., at least one SVC 23 irrespective of whether the SVC 23 is the master or the slave) to transmit the management information 233a.

Further, as depicted in FIG. 6, when the master CM 4 instructs a SVC 23 to execute a certain control, in the master SVC monitor mode, the master CM 4 makes the instruction to the control-target SVC 23 via the master SVC 23. In contrast, in the SVC independent operation mode, the master CM 4 directly instructs each SVC 23 (e.g., the control-target SVC 23) to execute the control bypassing the master SVC 23.

Referring back to FIG. 4, the memory unit 233 may store the management information 233a managed by the monitor control unit 232. The memory unit 233 may be embodied by storage areas in the memory 2b depicted in FIG. 3, for example.

Examples of the management information 233a include monitor information used for monitor controls by the SVCs 23 and a wide variety of information, e.g., system information of the relay apparatus 2, for example.

The monitor control unit 232 executes a monitor control of the relay apparatus 2. For example, the monitor control unit 232 may obtain the monitor information using the technique exemplified below, and may update the management information 233a.

(i) Heart Beat Monitor to Remote-Group SVC 23

Each SVC 23 in the relay apparatus 2 may regularly transmit signals (e.g., heart beats) to the SVC 23 and the CM 4 (e.g., the master CM 4 or all of the CMs 4) in the remote group. The monitor control unit 232 may obtain a reception result (reception circumstances) of a heartbeat received from the remote-group SVC 23 as monitor information on the remote-group SVC 23.

(ii) Input Power Supply Monitor

The monitor control unit 232 may monitor supplied power input to each unit. This monitor enables to monitor an occurrence of outage in the entire remote-group MP 20, an occurrence of partial outage in power feeding routes from a PSU 25 to other units in the group to which that PSU 25 belongs, and the like. For example, the monitor control unit 232 may obtain a direct current (DC) voltage input to the MP 20 and each unit and the like as monitor information on the local group.

(iii) State Monitor

In the relay apparatus 2, a status of a unit may be notified from each unit (or the MP 20 connected to that unit, the MP-EXTs 20a, or the MP-PSUs 20b, or the like) to the master SVC 23. That status may include a mount indicating, to the MP 20, the MP-EXTs 20a, the MP-PSUs 20b, or the like, that the unit is connected, and an unmount indicating that the unit is disconnected, for example.

Note that the monitor control unit 232 may obtain statuses defined in advance in the relay apparatus 2, measurement values the normal or abnormal ranges of which are defined, and the like, as monitor information. Examples of the measurement values include the numbers of revolutions of fans of the FANUs 24 or the temperatures of the respective units.

The monitor control unit 232 may obtain information, such as monitor results (e.g., heart beats) received from hardware of the units in the local group or the remote group, malfunction information, statuses of the respective modules, as monitor information on the local group or the remote group.

Furthermore, the monitor control unit 232 may manage version information of firmware of the SVC 23, statuses, such as states of turns-on of light emitting diodes (LEDs) of the MP 20 and the like, as system information included in the management information 233a.

Note that the monitor control unit 232 may obtain monitor information of the above-described (ii) or (iii) and the like in response to an instruction from the master CM 4, for example, even in the SVC independent operation mode. In contrast, with regard to the above-described (i), the SVC 23 may change the destination of a transmission to the master CM 4, and transmit a heartbeat to the master CM 4 in the SVC independent operation mode.

As exemplified in FIG. 4, the monitor control unit 232 may include an information synchronizing unit 234, an abnormality notifying unit 235, an information transmitting unit 236, a control instruction receiving unit 237, and an MP control unit 238.

The information synchronizing unit 234 synchronizes the management information 233a with the remote-group SVC 23. For example, the information synchronizing unit 234 may execute the synchronization by notifying the remote-group SVC 23 of the monitor information obtained by the monitor control unit 232, and merging monitor information received from the remote-group SVC 23 into the management information 233a. Furthermore, the information synchronizing unit 234 may execute the synchronization of the management information 233a by transmitting and receiving a wide variety of information (e.g., the system information of the local group) with the remote-group SVC 23, other than the monitor information.

In the master SVC monitor mode, the information synchronizing unit 234 may execute the synchronization of information described above between the SVCs 23 via the MP bridge 21.

In contrast, in the SVC independent operation mode, the master CM 4 takes the initiative in executing a monitor between the SVCs 23 (e.g., synchronization) in lieu of the SVC 23. Accordingly, the information synchronizing unit 234 may change the destination of a notification of the management information 233a from the remote-group SVC 23 to the master CM 4 and notify the master CM 4 of the management information 233a in response to an instruction from the master CM 4.

The abnormality notifying unit 235 determines whether or not each unit in the relay apparatus 2 is abnormal based on monitor information included in the management information 233a, and outputs (makes a notification of) the detected information on the abnormality to the CM 4.

For example, the abnormality notifying unit 235 may detect an abnormality based on a monitor result of any of the above-described (i) to (iii), or may detect an abnormality from a certain combination of monitor results of (i) to (iii). Depending on the type of the abnormality that arises, abnormalities may be detected in stages or similar timing for multiple monitor results related to the above-described (i) to (iii).

The information on an abnormality may include the type of monitor information (type of an abnormality) by which an abnormality is indicated, such as an outage, a heartbeat abnormality, and an unmount; and information indicating a failed site in which an abnormality arises, such as units (e.g., the FRTs 22 and the SVCs 23). The abnormality notifying unit 235 may generate such information on an abnormality for each type of an abnormality detected, and notify the CM 4 of the information.

Examples of abnormalities that may arise in the relay apparatus 2 are as follows. Hereinafter, for describing an example in which an abnormality arises in any of the groups, it is assumed that the group experiencing an abnormality is the #1 group and that the group not experiencing an abnormality is the #0 group.

(I) Outage in One of Groups (#1 group) in Relay Apparatus 2

In this case, in the SVC 23 in the #0 group, monitor information indicating an entire or partial outage in the #1 group is obtained through an input power supply monitor. Accordingly, the abnormality notifying unit 235 detects the entire or partial outage in the #1 group based on monitor information related to the input power supply monitor.

Furthermore, when a partial outage involving the entire #1 group or the SVC 23 in the #1 group arises, in the SVC 23 in the #0 group, a heartbeat will not be received from the SVC 23 in the #1 group experiencing the outage. Accordingly, in this case, the abnormality notifying unit 235 in the #0 group determines that no heartbeat has been received from the SVC 23 for a certain time duration based on monitor information related to the heartbeat monitor, and detects a heartbeat abnormality of the SVC 23 in the #1 group.

For a unit in the #1 group which stops its operation due to an outage, a status indicating an unmount may be notified to the SVC 23 in the #0 group. In this case, the abnormality notifying unit 235 detects unmounts of one or more units based on monitor information related to a state monitor.

(II) Hang-Up of SVC 23 in #1 Group

In this case, in the SVC 23 in the #0 group, no heartbeat is received from the SVC 23 in the #1 group which hangs up. Accordingly, the abnormality notifying unit 235 in the #0 group determines that no heartbeat has been received from the SVC 23 for a certain time duration based on monitor information related to the heartbeat monitor, and detects a heartbeat abnormality of the SVC 23 in the #1 group.

(III) Abnormality of SVC 23 in #1 Group

Abnormalities of the SVC 23 in the #1 group include abnormalities other than those of the above-described (I) or (II). Examples include cases in which the SVC 23 in the #1 group detects its own abnormality and makes a notification to the SVC 23 in the #0 group, and in which a status, a measurement value, or the like of the SVC 23 in the #1 group indicates a state of an abnormality or an abnormal value (equal to or greater or less than a certain threshold).

In such a case, the abnormality notifying unit 235 in the #0 group detects an abnormality of the SVC 23 in the #1 group based on monitor information.

(IV) Abnormalities of Other Units in #1 Group than SVC 23 in #1 Group

Examples of abnormalities of other units in the #1 group than the SVC 23 in the #1 group includes a case in which a status, a measurement value, or the like of a unit indicates a state of an abnormality or an abnormal value (equal to or greater or less than a certain threshold), for example. Examples include cases in which, the status of a unit indicates an abnormal state (e.g., unmount), and in which a measurement value, such as the numbers of revolutions of fans of the FANUs 24 and the temperatures of the respective units, indicates an abnormal value.

In such a case, the abnormality notifying unit 235 in the #0 group detects an abnormality in a unit in the #1 group based on monitor information. Note that a similar abnormality is also detected by the SVC 23 in the #1 group in such a case.

Note that the abnormalities of the above-described (I) to (IV) may be detected by any of the master SVC 23 and the slave SVC 23.

(V) Abnormality in the MP Bridge 21

In the storage apparatus 1 in accordance with one embodiment, as exemplified in FIGS. 1 and 2, redundancy is given to units in the relay apparatus 2 in the two groups. Those units in the two groups, however, are connected via a single MP bridge 21.

Because no redundancy is given for the MP bridge 21 as set forth above, access paths for inter-group communications in the relay apparatus 2 will be disconnected when an abnormality (e.g., malfunction) arises in the MP bridge 21. As a result, it becomes impossible to confirm states to each other between the master SVC 23 (e.g., the SVC #0) and the slave SVC 23 (e.g., the SVC #1).

Figure 7:
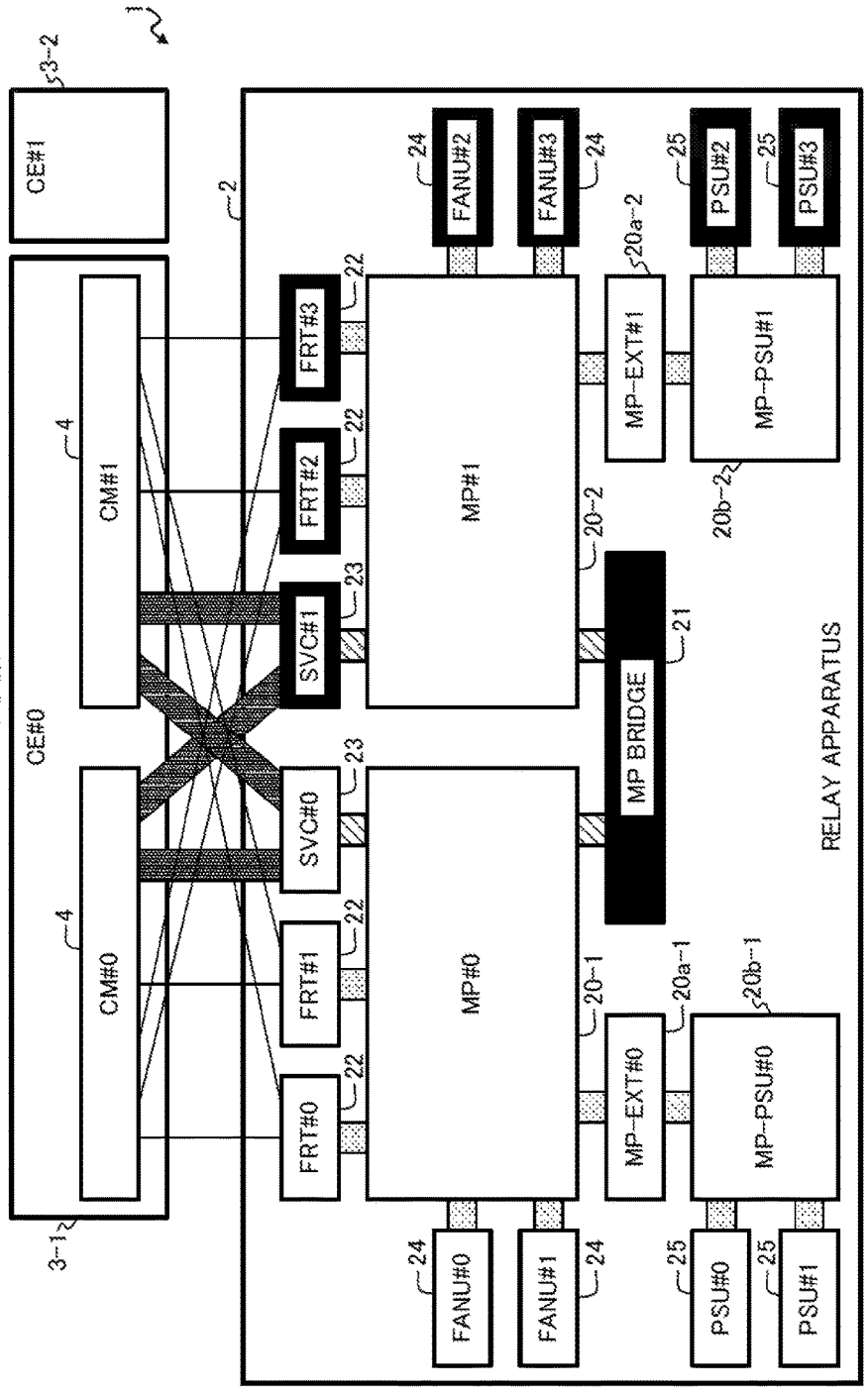
FIG. 7 is a diagram exemplifying ranges of the influence to a monitor control when an abnormality arises in a midplane (MP) bridge.

As one example, as depicted in FIG. 7, when an abnormality arises in the MP bridge 21, the SVC #1, the FRT #2, the FRT #3, the FANU #2, the FANU #3, the PSU #2, and the PSU #3 indicated in solid black are impossible to access from the master SVC #0. Accordingly, in the master SVC monitor mode, monitors of the units indicated in solid black become impossible when an abnormality arises in the MP bridge 21.

As described above, when an abnormality arises in the MP bridge 21, the abnormality notifying unit 235 can detect unmounts of all units in the remote group connected downstream to the MP bridge 21, as well as an unmount of the MP bridge 21.

Even when unmounts of all units in the remote group are detected in the abnormality notifying unit 235, however, it is highly probable that the unmounts of those units are caused by an abnormality in the MP bridge 21, and that all of the units in the remote group are actually normal.

Therefore, when unmounts of the MP bridge 21 and all units in the remote group are detected, the abnormality notifying unit 235 in the master SVC 23 notifies the CM 4 of information on an abnormality including information representing the MP bridge 21 as a failed site, based on monitor information related to the state of the MP bridge 21. With regard to units in the remote group (components under the group), the abnormality notifying unit 235 may inhibit (hold) to transmit a notification to the CM 4 that those units in the remote group are abnormal.

When the abnormality notifying unit 235 detects that a corresponding failed site is recovered with an active exchange or the like after notifying the CM 4 of information on the abnormality, the abnormality notifying unit 235 may notify the CM 4 of information indicating the recovery of the failed site. Note that the recovery of the failed site may be detected based on a change from the unmount state to the mount state in a state monitor (recognition of the isolated units in the remote group).

The destination of the notification by the abnormality notifying unit 235 may be the master CM 4, or may be multiple (e.g., all) CMs 4.

Because, in the SVCs 23, the master SVC 23 can make a notification (have an authority to make a notification) to the CMs 4 as set forth above, the master SVC 23 can make a notification of a failed site in the master SVC monitor mode. When the slave SVC 23 detects an abnormality of the master SVC 23, the slave SVC 23 may make a notification of failed site to the CMs 4 by promoting itself to the master SVC 23. As a result, even when an abnormality arises in the master SVC 23, it is assured that the CMs 4 can recognize the abnormality.

Note that the promotion of the slave SVC 23 to the master SVC 23 may be carried out by updating setting information or the like stored in a storing device (e.g., the memory 2b in the SVC 23) from the slave to the master, for example.

In contrast, in the SVC independent operation mode, because the master SVC 23 and the slave SVC 23 operate independently from each other, any SVC 23 detecting an abnormality or a recovery can make a notification to the CMs 4 (refer to FIG. 6). As described above, it is regarded that each SVC 23 has an authority to make a notification to the CMs 4 in the SVC independent operation mode, irrespective of whether the SVC 23 is the master or the slave.

The information transmitting unit 236 transmits information of a part or the entirety of the management information 233a to the master CM 4 in accordance with a request from the master CM 4.

For example, in the master SVC monitor mode, the information transmitting unit 236 in the master SVC 23 may transmit the management information 233a to the master CM 4. When the requested management information 233a is information managed by the slave SVC 23, the master SVC 23 may obtain the information from the slave SVC 23 (synchronizes the information), and then transmit it to the master CM 4.

In contrast, in the SVC independent operation mode, irrespective of whether it is the master or the slave, an information transmitting unit 236 in each SVC 23 may transmit management information 233a to the master CM 4 in accordance with an instruction from the master CM 4.

The control instruction receiving unit 237 receives a control instruction for a control of the relay apparatus 2 from the master CM 4, and notifies the MP control unit 238 of that control instruction.

For example, in the master SVC monitor mode, the control instruction receiving unit 237 in the master SVC 23 receives a control instruction from the master CM 4, and notifies the MP control unit 238 in the local-group or remote-group SVC 23 that is the control target of that control instruction.

In contrast, in the SVC independent operation mode, the control instruction receiving unit 237 in the control-target SVC 23 receives a control instruction from the master CM 4, notifies the MP control unit 238 in the local SVC 23 of that control instruction.

The MP control unit 238 controls units in the local group (e.g., executes controls of LEDs and fans, degeneration or built-in controls of units) in accordance with a control instruction received from the control instruction receiving unit 237 in the local group or the remote group.

As one example, when degeneration of a unit in the local group is instructed from the master CM 4, the MP control unit 238 may disable or reset that unit, stop the unit by control to turn off the power supply feed to the unit, and respond the master CM 4 with a completion. Such degeneration of a unit may be carried out by a wide variety of well-known techniques, and the details of procedures for degeneration of the respective units will be omitted.

With Regard to CMs 4

Figure 8:
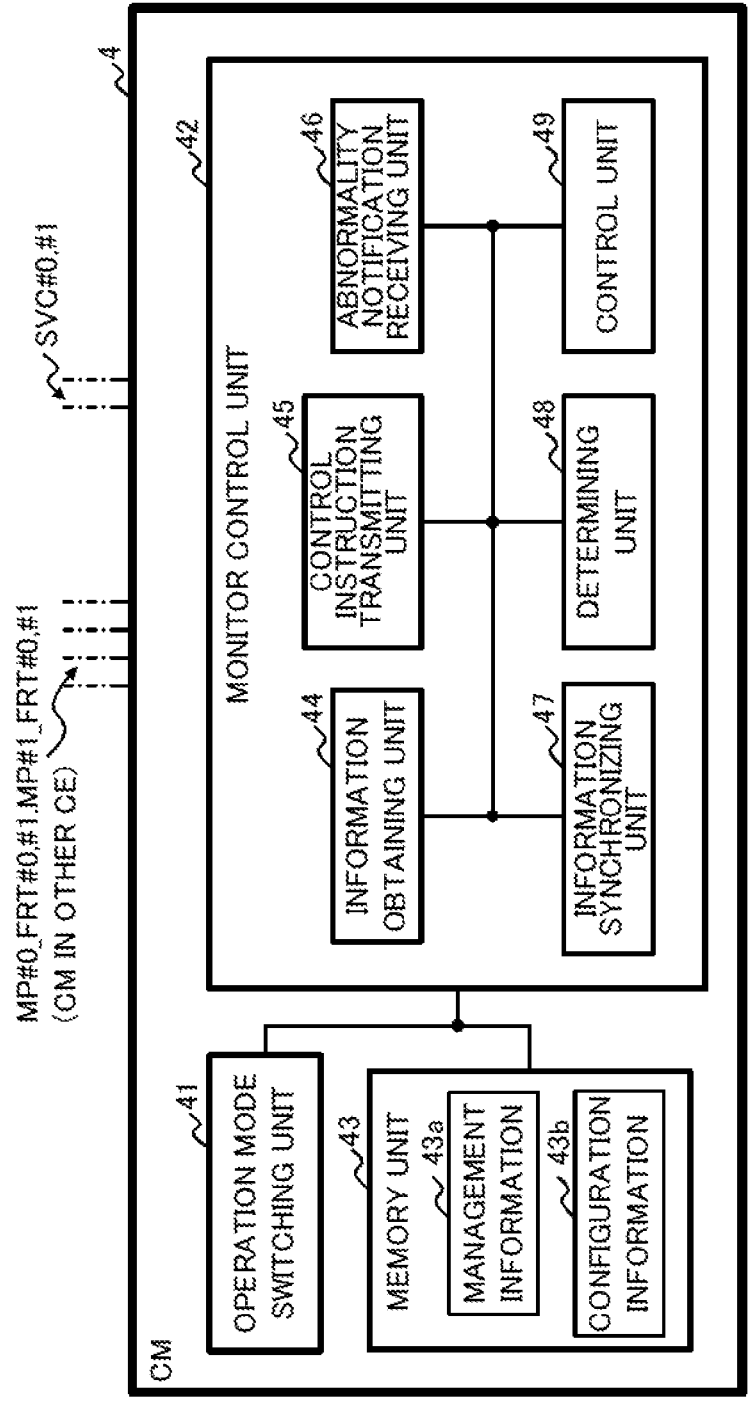
FIG. 8 is a diagram depicting an exemplary functional configuration for a monitor control process of the CMs depicted in FIG. 1.

Next, referring to FIG. 8, an exemplary functional configuration of the CMs 4 in accordance with one embodiment will be described. FIG. 8 is a block diagram depicting an exemplary functional configuration for a degeneration process of the CMs 4 depicted in FIG. 1.

As depicted in FIG. 8, the CM 4 may include an operation mode switching unit 41, a monitor control unit 42, and a memory unit 43, for example.

The operation mode switching unit 41 switches the operation mode of a monitor control in accordance with a switching determination result of the operation mode in the monitor control unit 42 in the master CM 4. For switching operation modes, the operation mode switching unit 41 in the master CM 4 may notify the operation mode switching unit 231 in each SVC 23 of a switch instruction of operation modes.

In other words, the operation mode switching unit 41 represents one example of a switching unit that executes a switching process for switching the communication route used for synchronization of the management information 233a between the first and second SVCs 23, from the first communication route via the MP bridge 21 to the second communication route. The switching of the communication route from the first communication route to the second communication route may be carried out in response to a notification of information on an abnormality the MP bridge 21 from the master SVC 23 as a trigger. Furthermore, when receiving information on a recovery of the MP bridge 21 from the master SVC 23, the operation mode switching unit 41 may switch the communication route from the second communication route to the first communication route.

The memory unit 43 may store the management information 43a and the configuration information 43b. The memory unit 43 may be embodied by storage areas in the memory 4b depicted in FIG. 3, for example.

The configuration information 43b represents one example of information managed by the master CM 4 and indicating the state of the storage apparatus 1. One example of the configuration information 43b is depicted in FIG. 9. As depicted in FIG. 9, the configuration information 43b may include information of each unit (e.g., the unit name) and the state of that unit (e.g., whether the unit is online or offline), and the like. While only states of the units in the relay apparatus 2 are indicated in the example in FIG. 9 for the sake of illustration, other units in the storage apparatus 1 (e.g., the states of the components in the CEs 3 and the DEs 5) may be set and managed in the configuration information 43b.

The configuration information 43b may be used for presenting the state of the storage apparatus 1 to output devices (the I/O units 4e) in the CMs 4, the host apparatus, a working terminal, and the like, for example. For example, an administrator or other users of the storage apparatus 1 can carry out maintenance tasks, such as replacement of the failed site based on the presented information.

The monitor control unit 42 executes a monitor control of the storage apparatus 1 including the relay apparatus 2. In the SVC independent operation mode, the monitor control unit 42 in accordance with one embodiment may execute at least part of a monitor control to be executed by the monitor control unit 232 in the SVC 23 in lieu thereof, for example. The at least part of the monitor control may include a synchronization of the management information 233a, and a monitor based on the synchronized management information 233a.

As one example, in response to signals (e.g., heartbeats) of which the transmission destination have been switched in each SVC 23, the monitor control unit 42 may execute a heartbeat monitor of the above-described (i).

As exemplified in FIG. 8, the monitor control unit 42 may include an information obtaining unit 44, a control instruction transmitting unit 45, an abnormality notification receiving unit 46, an information synchronizing unit 47, a determining unit 48, and a control unit 49. Their functions may be embodied by the control program 400 executed by the CPU 4a. While it is assumed that the CM 4 depicted in FIG. 8 is the master CM 4 in the following descriptions, the configuration exemplified in FIG. 8 may represent all of the CMs 4 in the storage apparatus 1 because the slave CM 4 may promote to the master CM 4 due to an abnormality of the master CM 4.

The information obtaining unit 44 obtains information on the relay apparatus 2 (e.g., the management information 233a) from the SVC 23. For example, in the master SVC monitor mode, the information obtaining unit 44 may transmit an obtainment request for the information to the master SVC 23.

Furthermore, in the SVC independent operation mode, the information obtaining unit 44 may transmit an obtainment request for information to an SVC 23 from which the information is to be obtained. When the information is to be obtained from multiple SVCs 23, the information obtaining unit 44 may obtain management information 233a from the respective SVCs 23, merge the obtained management information 233a, and manage the merged information as the management information 43a.

The control instruction transmitting unit 45 represents one example of a transmitting unit that transmits a control instruction on the relay apparatus 2 to the SVCs 23. For example, in the master SVC monitor mode, the control instruction transmitting unit 45 may transmit a control instruction to the master SVC 23. When the control instruction is addressed to the slave SVC 23, that control instruction is transmitted via the master SVC 23 and first communication route.

On the other hand, in the SVC independent operation mode, the control instruction transmitting unit 45 may transmit a control instruction to the control-target SVC 23 via the second communication route.

The abnormality notification receiving unit 46 represents one example of a receiving unit that receives information on an abnormality or information indicating a recovery of the failed site, transmitted from the SVC 23.

For example, in the master SVC monitor mode, the abnormality notification receiving unit 46 may receive information on the abnormality detected by the slave SVC 23 via the first communication route and the master SVC 23.

On the other hand, in the SVC independent operation mode, the abnormality notification receiving unit 46 may receive the information on the abnormality detected by the slave SVC 23 from the slave SVC 23 via the second communication route.

Note that the abnormality notification receiving unit 46 in the slave CM 4 may transfer the receive information to the master CM 4. This prevents the situation in which the master CM 4 is not able to obtain a notification from an SVC 23 due to an error or the like.

The information synchronizing unit 47 synchronizes information between the SVCs 23 in lieu of the master SVC 23 when the operation mode is the SVC independent operation mode.

Upon a synchronization of information, the information synchronizing unit 47 may obtain management information 233a managed by each SVC 23 from each SVC 23, merge the obtained management information 233a, and store the merged information in the memory unit 43 as the management information 43a (update it). Note that, when the monitor control unit 42 executes a monitor control in lieu of the master SVC 23, the information synchronizing unit 47 may also merge monitor information obtained by the monitor control unit 42 to the management information 43a.

As described above, in the SVC independent operation mode, either or both of the information obtaining unit 44 and the information synchronizing unit 234 represent examples of an obtaining unit that obtains management information 233a from each of the first and second SVCs 23 using the second communication route.

The determining unit 48 determines the target (e.g., failed site) which undergoes a degeneration process by the control unit 49 based on at least one of information input from the abnormality notification receiving unit 46 and the management information 43a in the memory unit 43.

For example, in response to information on an abnormality notified from the abnormality notification receiving unit 46 based on the above-described (I) to (V) or the like, the determining unit 48 may determine the failed site included in the information as the target of the degeneration process. Further, in the SVC independent operation mode, the determining unit 48 may detect an abnormality in a unit including an SVC 23 based on monitor information in the management information 43a, for example, in the above-described (I) to (IV) or the like, and may determine the target of the degeneration process.

Note that, when receiving information on abnormalities of multiple units, the determining unit 48 may determine abnormalities in one or more units which may influence multiple units by taking those units into considerations in a comprehensive manner. In this case, the determining unit 48 may look up the configuration information 43b stored in the memory unit 43. Examples of one or more units which may influence multiple units include the MPs 20, the MP-EXTs 20a, the MP-PSUs 20b, and the MP bridge 21, for example.

Further, when the determining unit 48 is notified of an abnormality in the MP bridge 21 or detects the abnormality in the MP bridge 21, the determining unit 48 may instruct the operation mode switching unit 41 to cause the operation mode to be transitioned to the SVC independent operation mode. Note that transition of the operation mode to the SVC independent operation mode may be carried out when the master CM 4 makes a living confirmation to both the master and slave SVCs 23 and when the both SVCs 23 are normal.

For example, an abnormality may arise in the SVC 23 before or after an abnormality arises in the MP bridge 21. In this case, when a unit under the SVC 23 experiencing the abnormality fails, the failure of the unit is difficult to be detected or addressed because access paths to the respective units under that SVC 23 are disconnected due to the abnormality of the SVC 23. Because the SVC 23 is also abnormal, degeneration of the SVC 23 experiencing the abnormality and the units under that SVC 23 from the master CM 4 is also difficult.

As described above, when the MP bridge 21 and the SVC 23 become abnormal, it may be failed to address a critical failure in the relay apparatus 2.

To avoid such a situation, when both the MP bridge 21 and an SVC 23 are abnormal, the determining unit 48 may instruct the control unit 49 to stop the entire system (the storage apparatus 1).

Note that, when both the MP bridge 21 and an SVC 23 are abnormal, the abnormality notification receiving unit 46 receives information on the respective abnormalities of the MP bridge 21 and the SVC 23 from the master SVC 23.

Alternatively, when an abnormality arises in the MP bridge 21 first, the master CM 4 monitors both of the master and slave SVCs 23 through the SVC independent operation mode. In such a case, when an abnormality arises in one of the SVCs 23, the determining unit 48 can detect an error of a heartbeat monitor by the monitor control unit 42, a synchronization error in the information synchronizing unit 47, or the like.

As described above, the determining unit 48 can detect abnormalities of the MP bridge 21 and an SVC 23 using a wide variety of techniques.

Further, when the determining unit 48 receives information indicating that the failed site has recovered (a notification that the unit has been mounted) from the abnormality notification receiving unit 46, the determining unit 48 may instruct the control unit 49 to execute a built-in process of the applicable unit to the system.

The control unit 49 executes a degeneration process (detachment process) or a built-in process on a target unit that is to undergo the degeneration process or built-in process, instructed from the determining unit 48.

In other words, the control unit 49 represents one example of a detachment processing unit that executes a detachment process for detaching a failed site from the relay apparatus 2, based on information on an abnormality of at least one module received by the abnormality notification receiving unit 46.

The degeneration process may include a process for transmitting an instruction to stop the operation of the failed site, to the master SVC 23 or a SVC 23 of a group (MP 20) containing the failed site (e.g., the slave SVC 23). The degeneration process may also include a process for setting "disabled" to the state of the unit corresponding to the failed site in the configuration information 43b.

Examples of the degeneration process by the control unit 49 include the following processes depending on the target of the degeneration process. Hereinafter, for describing an example in which an abnormality arises in any of the groups, it is assumed that the group experiencing an abnormality is the #1 group and that the group not experiencing an abnormality is the #0 group.

(a) Abnormalities of the Respective Units in #1 Group (when MP Bridge 21 is Normal)

In this case, because the monitor mode is the master SVC monitor mode, the control unit 49 may stop a degeneration-target unit by transmitting an instruction to the master SVC #0. Furthermore, when a completion of the stop (degradation) is notified from the master SVC #0, the control unit 49 may update the configuration information 43b so as to disable the state of the degeneration-target unit.

Note that, upon updating the configuration information 43b, the control unit 49 may disable a degeneration-target unit (e.g., "SVC#1") by setting a value indicating invalid (e.g., "offline") to the status in the entry of a degeneration-target unit.

(b) Abnormalities of Respective Units in #1 Group (when MP Bridge 21 is Also Abnormal)

When the MP bridge 21 is abnormal, a determination is made by the determining unit 48 to switch the operation mode to the SVC independent operation mode, and the CMs 4 and the SVCs 23 transition to the SVC independent operation mode.

In this case, the control unit 49 executes one of the following processes depending on whether the unit experiencing the abnormality is the SVC #1 or not.

(b-1) when Unit Experiencing Abnormality is not SVC #1

The control unit 49 may cause the degeneration-target unit to stop by transmitting an instruction to the SVC #1 in the #1 group containing that unit, and update the configuration information 43b so as to disable the state of the degeneration-target unit when a completion of the stop (degradation) is notified from the SVC #1.

(b-2) when Unit Experiencing Abnormality is SVC #1

The control unit 49 is instructed from the determining unit 48 to stop the entire system. In this case, the control unit 49 may stop the system by shutting down the system, for example. As one example, the control unit 49 may generate a pseudo outage in the system to shut down the system.

Thereby, the master CM 4 can detach, from the system, a failed site having an access path that has been disconnected due to an abnormality in the MP bridge 21, using a redundant route. Accordingly, an occurrence of a critical failure is prevented in the system, thereby improving the availability of the system. Note that a shutdown of the system may be carried out by a wide variety of well-known techniques, and descriptions of the details thereof will be omitted.

As described above, the control unit 49 represents one example of a stopping unit that executes a stop process for stopping the storage apparatus 1 when the received information on the abnormality is information on abnormalities of the MP bridge 21 and an SVC 23.

Next, a built-in process by the control unit 49 will be described. The built-in process may include a process for setting "enabled" to the state of a recovered unit in the configuration information 43b.

As one example, the control unit 49 can enable the recovered unit by setting a value indicating enabled (e.g., "online") to the status in the entry of the recovered unit (e.g., "SVC#1").

As set forth above, in the storage apparatus 1 in accordance with one embodiment, the new relay apparatus 2 is provided which includes the multiple MPs 20 including the FRTs 22 and the SVCs 23, in addition to the CEs 3 and the DEs 5. In such a configuration, assuring a degeneration of a failed site in the relay apparatus 2 and preventing an occurrence of a secondary malfunction or the like, for example are effective as one of countermeasures to improve the availability of the system.

Therefore, in one embodiment, for example, information on an abnormality detected by an SVC 23 is notified to the CMs 4, and a degeneration process of a failed site is executed by a CM 4 via a route from a CE 3 to the multiple SVCs 23. This assures that the SVC 23 executing a monitor in the relay apparatus 2 detects an abnormality in the relay apparatus 2, and that the CM 4 controlling the storage apparatus 1 degrades the failed site.

Furthermore, the CMs 4 can retain and manage management information (the configuration information 43b) for managing the state of the storage apparatus 1. As a result, it is possible to cause the CMs 4 to execute a degeneration process and a built-in process, and to identify a failed site (degradation target) easily and reliably. Further, it is possible to manage information of a unit undergoing the degeneration or the embedding in a centralized manner, which provides an increased convenience to manage the system.

Further, when the MP bridge 21 fails, the CM 4 can synchronize information between the SVCs 23 in lieu of the master SVC 23. This gives redundancy to the monitor path between the SVCs 23 using the route via the CM 4 bypassing the MP bridge 21, thereby improving the availability of the system, as well as realizing lower costs and reduced space, as compared to the case in which redundancy is given to the MP bridge 21.

(1-4) Exemplary Operation of Storage Apparatus

Next, an exemplary operation of the storage apparatus 1 configured as set forth above will be described. Note that, in the following descriptions, it is assumed that the master CM #0 and the master SVC #0 belong to the #0 group, and the slave CM #1 and the slave SVC #1 belong to the #1 group for the sake of illustration.

(1-4-1) Exemplary Operation when MP Bridge is Normal

Initially, referring to FIGS. 10 and 11, an exemplary operation when the MP bridge 21 is normal will be described. Note that the CM 4 and the SVC 23 operate in the master SVC monitor mode when the MP bridge 21 is normal.

Figure 10:
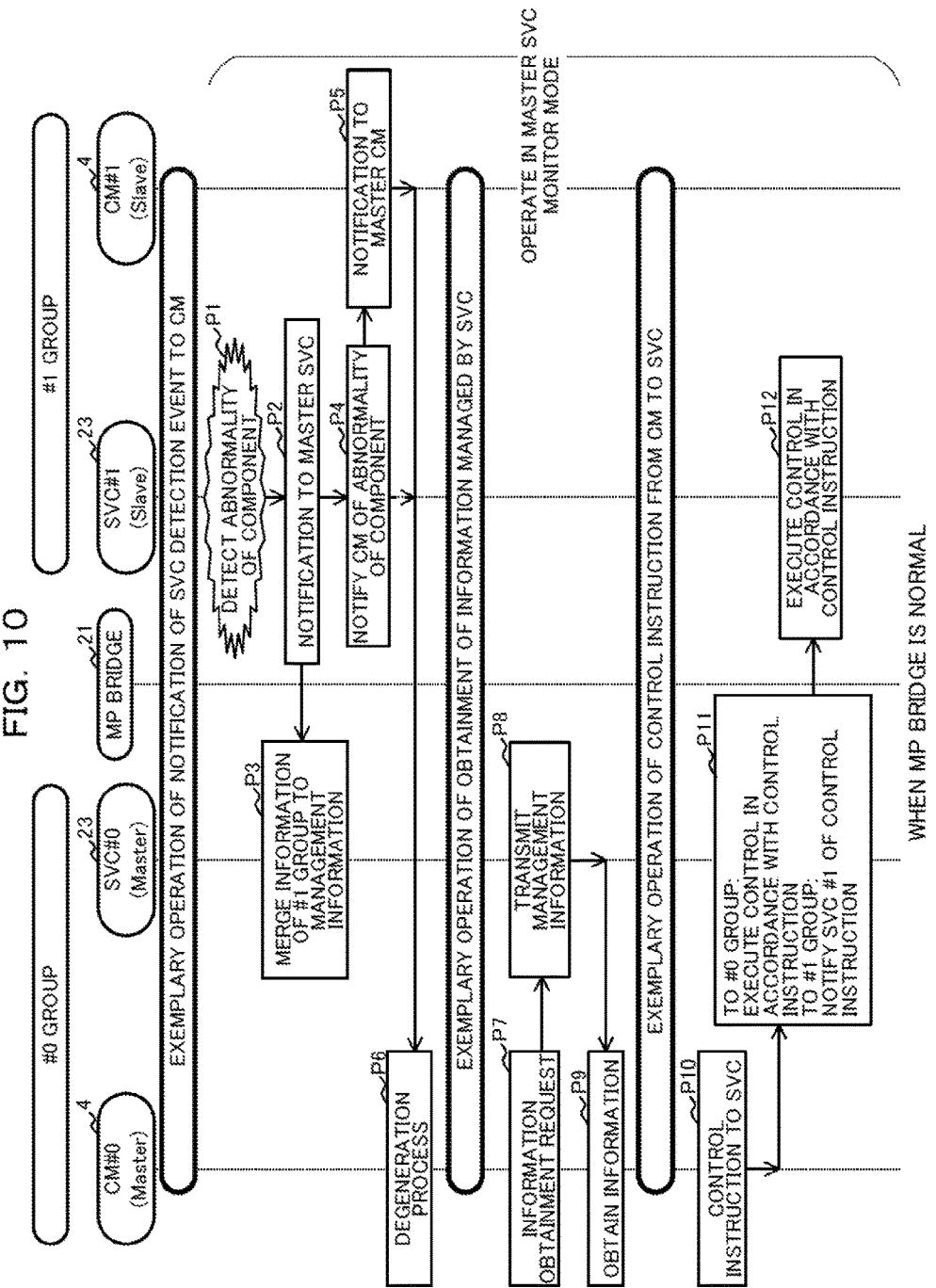
FIG. 10 is a flowchart illustrating exemplary operations of the storage apparatus when the MP bridge is normal.

As exemplified in FIG. 10, when the slave SVC #1 detects an abnormality in a unit in the local group (Process P1), the slave SVC #1 notifies the master SVC #0 of information on that abnormality through a communication between the SVCs 23 via the MP bridge 21 (Process P2).

The master SVC #0 merges the information received from the slave SVC #1 with the management information 233a managed by the master SVC #0 (Process P3).

Further, the slave SVC #1 notifies the slave CM #1 in the local group of the information on the abnormality (Process P4). The slave the CM #1 notifies the master CM #0 of the information (Process P5). While the slave SVC #1 notifies the slave CM #1 in the local group of the information in Process P4 (notification through the straight line), the slave SVC #1 may skip Process P5 and make a notification directly to the remote-group master CM #0 (notification through the cross line).

The master CM #0 executes a degeneration process on the unit experiencing the abnormality (Process P6). The degeneration process may include a determination of a degeneration-target by the determining unit 48, an update of the state of the configuration information 43b, a degeneration instruction to the master SVC #0 by the control unit 49, and a notification of an abnormality to an administrator, for example.

In the processes described above, when the MP bridge is normal, an event detected at the SVC 23 is notified to the CM 4 (refer to "NOTIFICATION OF SVC DETECTION EVENT TO CM" in "MASTER SVC MONITOR MODE" in FIG. 6).

Further, as exemplified in FIG. 10, when the master CM #0 attempts to obtain information managed by the SVC 23, the information obtaining unit 44 makes an information obtainment request to the master SVC #0 by transmitting a command or the like (Process P7).

The information transmitting unit 236 in the master SVC #0 reads a part or the entirety of the management information 233*a* managed by the master SVC #0 from the memory unit 233 and transmits it to the master CM #0 (Process P8).

The master CM #0 obtains information from the master SVC #0 (Process P9), and executes a process using the information. Note that, because the monitor mode is the master SVC monitor mode, information on the both SVCs 23 has been merged to the management information 233*a* in the master SVC #0. Accordingly, the master CM #0 can obtain information on the both group by obtaining the information from the master SVC 23.

In the processes described above, information managed by the SVC 23 is obtained by the master CM 4 (refer to "OBTAINMENT OF INFORMATION MANAGED BY SVC" in "MASTER SVC MONITOR MODE" in FIG. 6).

Further, as exemplified in FIG. 10, when a control instruction is attempted to the SVC 23 from the master CM #0, the control instruction transmitting unit 45 in the master CM #0 transmits a control instruction to the master SVC #0 (Process P10).

The control instruction receiving unit 237 in the master SVC #0 recognizes the group instructed in the control instruction received from the master CM #0. For example, when the control instruction is addressed to the local group (the #0 group), the master SVC #0 executes a control in accordance with the control instruction. In contrast, when the control instruction is addressed to the remote group (the #1 group), the master SVC #0 notifies the slave SVC #1 of that control instruction (Process P11).

In response to receiving the control instruction from the master SVC #0, the slave SVC #1 executes a control in accordance with the control instruction (Process P12).

In the processes described above, a process associated with the control instruction from the CM 4 to the SVC 23 completes (refer to "CONTROL INSTRUCTION FROM CM TO SVC" in "MASTER SVC MONITOR MODE" in FIG. 6).

Figure 11:
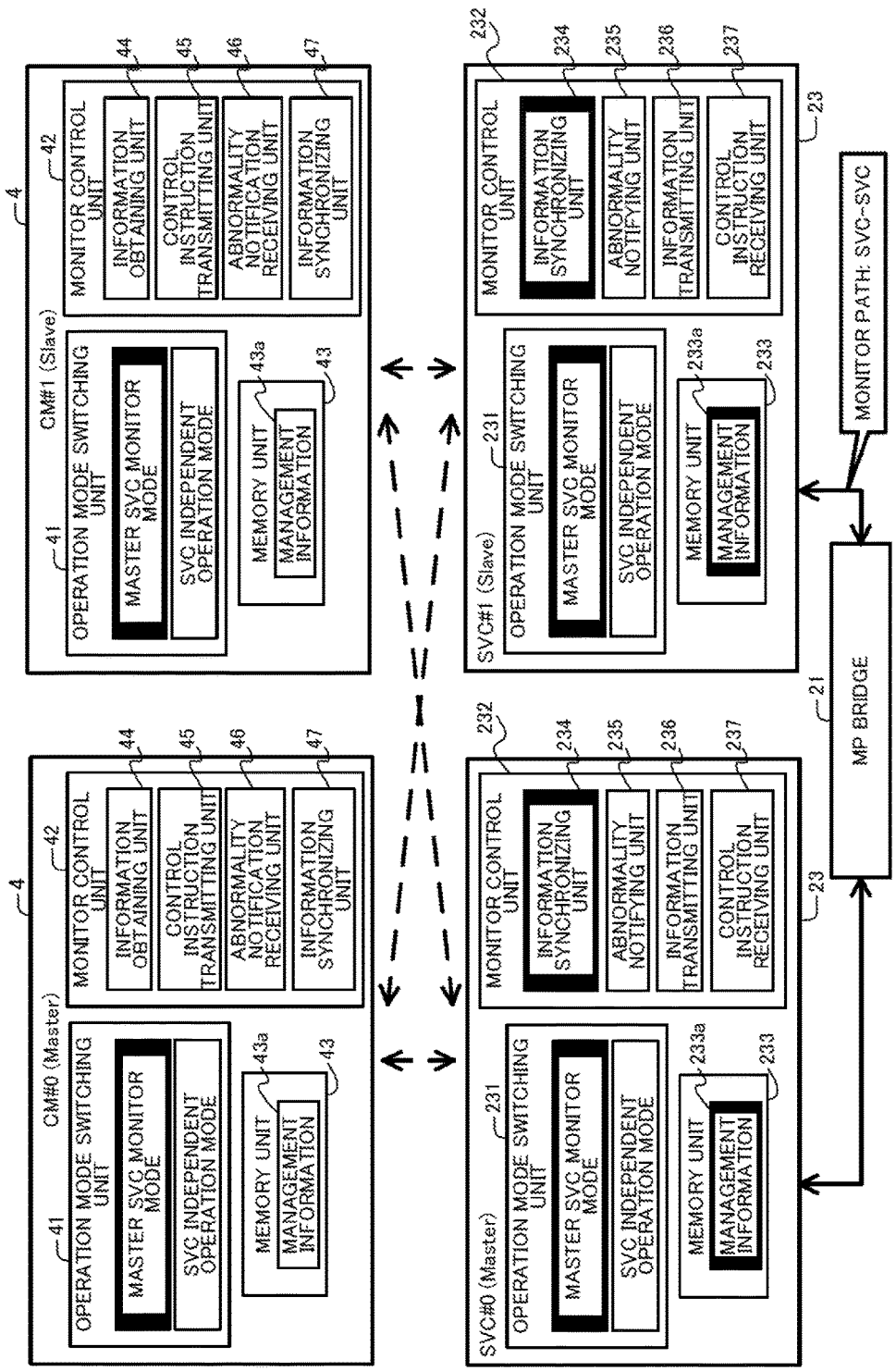
FIG. 11 is a diagram depicting one example of a monitor path used when the MP bridge is normal.

As set forth above, when the MP bridge 21 is normal, in the storage apparatus 1, the operation mode, the information, and the entities of synchronizations indicated in the solid black in FIG. 11 are activated, and a synchronization of information between the SVCs 23 is executed through the monitor path via the MP bridge 21. In this case, the master CM #0 can execute an obtainment and a control of information via the master SVC #0.

(1-4-2) Exemplary Operation when Abnormality Arises in MP Bridge

Next, referring to FIGS. 12 to 14, an exemplary operation when an abnormality arises in the MP bridge 21 will be described.

Figure 12:
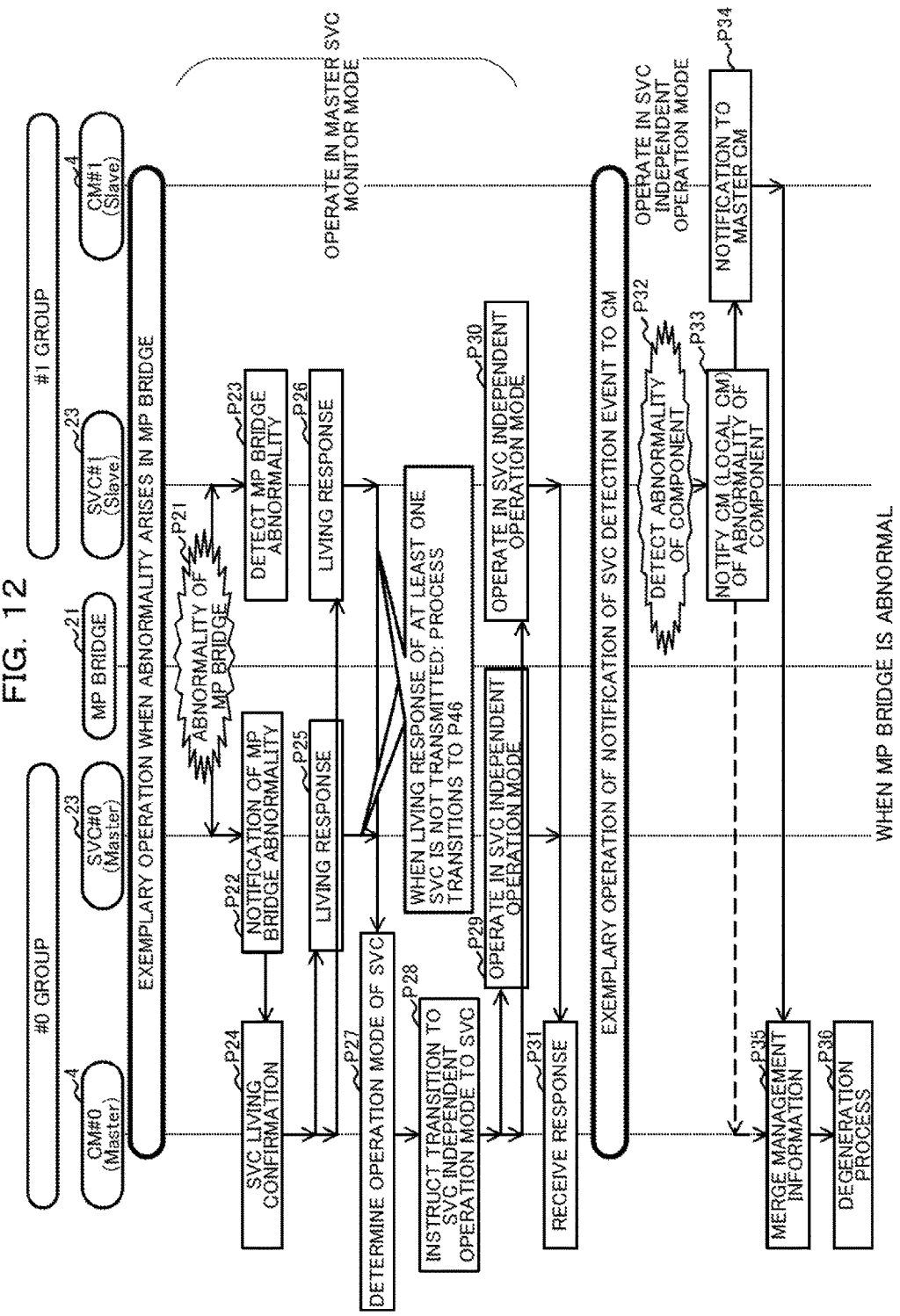
FIG. 12 is a flowchart illustrating exemplary operations of the storage apparatus when the MP bridge is abnormal.

As exemplified in FIG. 12, in the master SVC monitor mode, when an abnormality arises in the MP bridge 21 (Process P21), the master SVC #0 detecting the abnormality notifies the master CM #0 in the local group of the abnormality in the MP bridge 21 (Process P22). Although the slave SVC #1 also detects the abnormality in the MP bridge 21 (Process P23), the slave SVC #1 waits because it is the slave.

The master CM #0 executes a living confirmation to each of the master SVC #0 and the slave SVC #1 (Process P24). The master SVC #0 and the slave SVC #1 return respective living responses to the master CM #0 (Processes P25 and P26).

Because all of the SVCs 23 are normal, the determining unit 48 in the master CM #0 determines the operation mode of the SVC 23 as the SVC independent operation mode (Process P27). Furthermore, each of the operation mode switching units 41 in the master CM #0 and the slave CM #1 switches the operation mode to the SVC independent operation mode. Note that, when at least one of living responses are not sent in Processes P25 and P26, the process transitions to P46 in FIG. 13.

The operation mode switching unit 41 in the master CM #0 also instructs both the master SVC #0 and the slave SVC #1 to transition to the SVC independent operation mode (Process P28).

In response to the instruction from the master CM #0, each of the operation mode switching units 231 in the master SVC #0 and the slave SVC #1 switches the operation mode to the SVC independent operation mode (Process P29 and P30), and transmits a response to the master CM #0. When the master CM #0 receives a response from each SVC 23 (Process P31), the switching of the operation mode ends.

Further, as exemplified in FIG. 12, in the SVC independent operation mode, when detecting an abnormality in a unit in the local group (Process P32), the slave SVC #1 notifies the slave CM #1 in the local group of information on that abnormality (Process P33). Note that, because communications between the SVCs 23 are unavailable due to the abnormality in the MP bridge 21, the information is not notified to the master SVC #0.

The slave CM #1 notifies the master CM #0 of the information via the communication path between the CM 4 and the SVC 23 (Process P34). While the slave SVC #1 makes the notification to the slave CM #1 in the local group in Process P34 (notification through the straight line), the slave SVC #1 may skip Process P34 and make a notification directly to the remote-group master CM #0 (notification through the cross line).

The master CM #0 merges the received information on the abnormality to the management information 43*a* and manages it (Process P35), and executes a degeneration process on the unit experiencing the abnormality (Process P36). The degeneration process may include a determination of a degeneration-target by the determining unit 48, an update of the state of the configuration information 43*b*, a degeneration instruction to the slave SVC #1 by the control unit 49, and a notification of an abnormality to an administrator, for example.

In the processes described above, when the MP bridge is abnormal, an event detected at the SVC 23 is notified to the CM 4 (refer to "NOTIFICATION OF SVC DETECTION EVENT TO CM" in "SVC INDEPENDENT OPERATION MODE" in FIG. 6).

Figure 13:
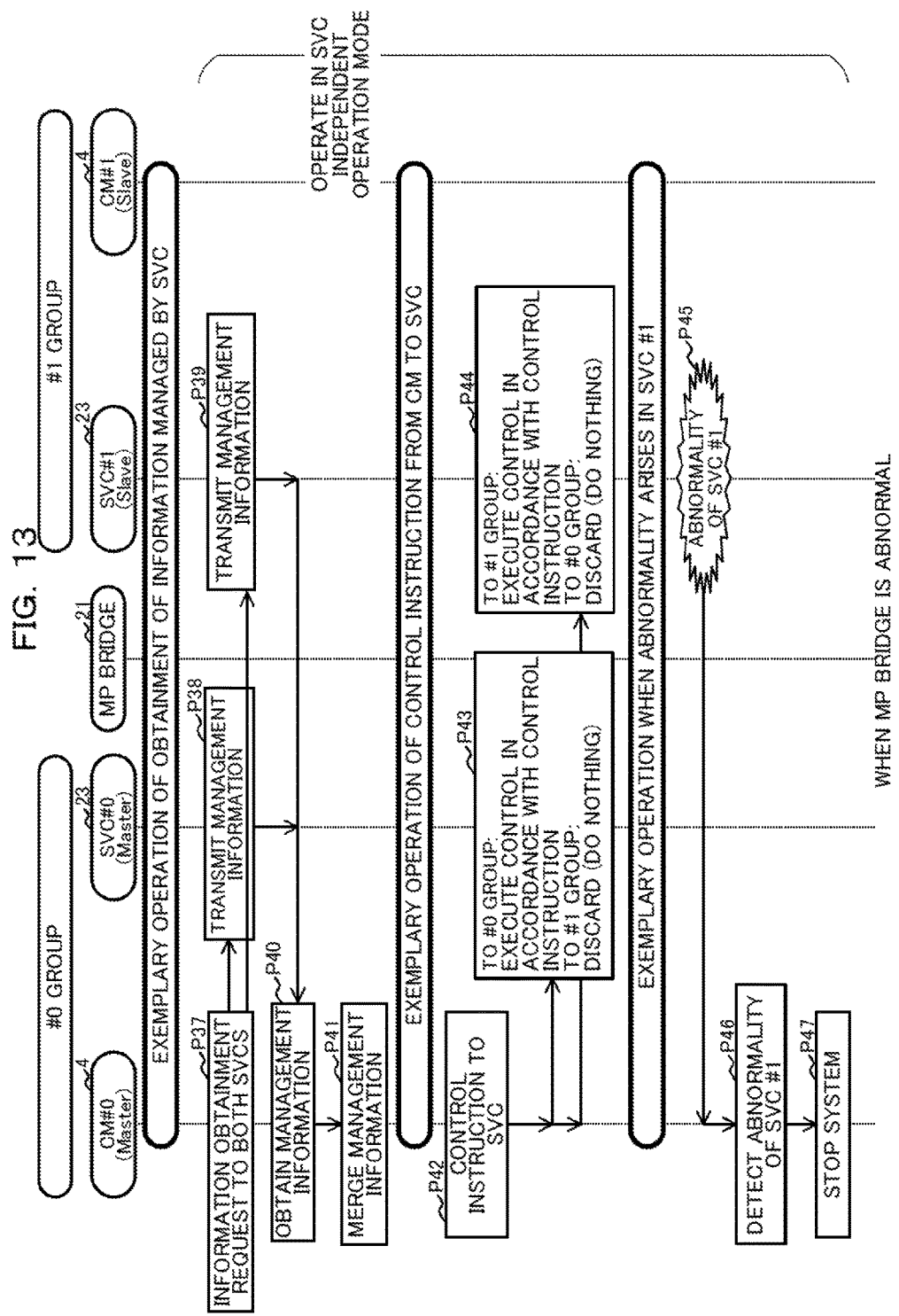
FIG. 13 is a flowchart illustrating exemplary operations of the storage apparatus in accordance with one embodiment when the MP bridge is abnormal.

Further, as exemplified in FIG. 13, when the master CM #0 attempts to obtain information managed by the SVC 23, the information obtaining unit 44 makes an information obtainment request to both the master SVC #0 and the slave SVC #1 by transmitting a command (Process P37).

The information transmitting unit 236 in the master SVC #0 reads a part or the entirety of the management information 233a managed by the master SVC #0 from the memory unit 233 and transmits it to the master CM #0 (Processes P38 and P39).

The master CM #0 obtains information from each of the master SVC #0 and the slave SVC #1 (Process P40), merges the information to the management information 43a (Process P41), and executes a process using the management information 43a. Because information of the #0 group and the #1 group is independently managed in the respective groups (the SVCs 23) in the SVC independent operation mode, the information of the both groups can be integrated through Process P41.

In the processes described above, information managed by the SVC 23 is obtained by the master CM 4 (refer to "OBTAINMENT OF INFORMATION MANAGED BY SVC" in "SVC INDEPENDENT OPERATION MODE" in FIG. 6).

Further, as exemplified in FIG. 13, when a control instruction is attempted to the SVC 23 from the master CM #0, the control instruction transmitting unit 45 in the master CM #0 transmits a control instruction to each of the master SVC #0 and the slave SVC #1 (Process P42).

The control instruction receiving unit 237 in the master SVC #0 recognizes the group instructed in the control instruction received from the master CM #0. For example, when the control instruction is addressed to the local group (the #0 group), the master SVC #0 executes a control in accordance with the control instruction. In contrast, when the control instruction is addressed to the remote group (the #1 group), the master SVC #0 discards that control instruction (does nothing) (Process P43).

The slave SVC #1 recognizes the group instructed in the control instruction received from the master CM #0. For example, when the control instruction is addressed to the local group (the #1 group), the slave SVC #1 executes a control in accordance with the control instruction. In contrast, when the control instruction is addressed to the remote group (the #0 group), the slave SVC #1 discards that control instruction (does nothing) (Process P44).

While the control instruction is transmitted to both the master SVC #0 and the slave SVC #1 in the example in FIG. 13, the control instruction may be transmitted to the SVC 23 to be instructed.

In the processes described above, a process associated with the control instruction from the CM 4 to the SVC 23 completes (refer to "CONTROL INSTRUCTION FROM CM TO SVC" in "SVC INDEPENDENT OPERATION MODE" in FIG. 6).

Figure 14:
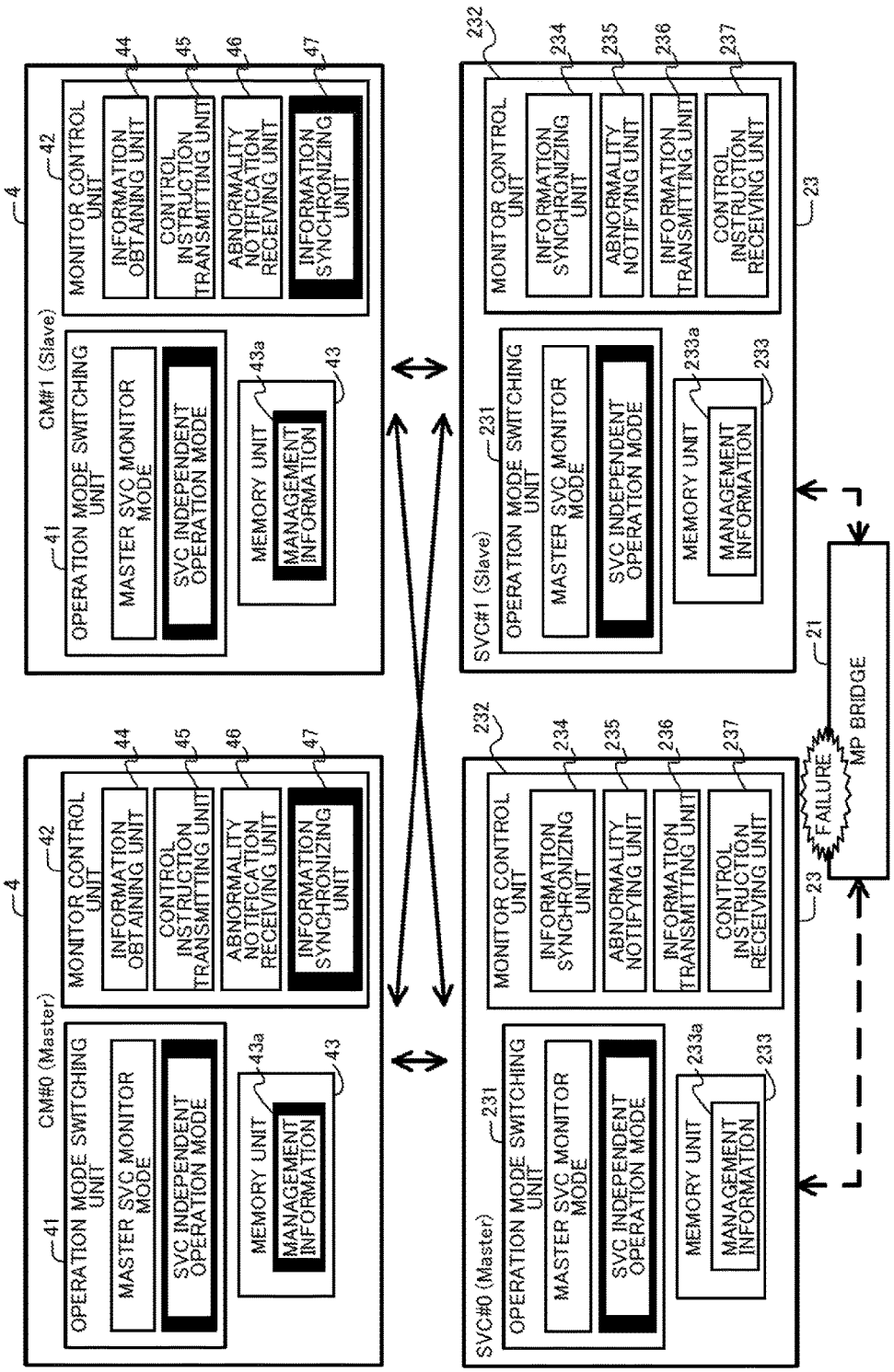
FIG. 14 is a diagram depicting one example of a monitor path used when the MP bridge is abnormal.

As set forth above, when the MP bridge 21 is abnormal, in the storage apparatus 1, the operation mode, the information indicated in the solid black in FIG. 14, and the entities of synchronizations are activated, and a synchronization of information is executed by monitor path via a communication line between the CM 4 and the SVCs 23, and the CM 4. In this case, the master CM #0 can execute an obtainment and a control of information directly on the control-target SVC 23 via the communication line.

Further, as exemplified in FIG. 13, when an abnormality arises in the slave SVC #1 (Process P45), the master CM #0 detects the abnormality in the slave SVC #1 (Process P46). In this case, the master CM #0 stops the system by any technique, such as generating a pseudo outage in the system (Process P47), and the process ends.

Note that an abnormality of the SVC 23 may be detected by a wide variety of techniques as set forth above. For example, the master CM #0 may detect the abnormality of the SVC 23 when no living response is received from the SVC 23 in at least one of Processes P25 and P26 in FIG. 12. Alternatively, the master CM #0 may detect the abnormality of the SVC 23 based on monitor information obtained in the synchronization of information.

(1-4-3) Exemplary Operation of Recovery of MP Bridge

Next, referring to FIG. 15, an exemplary operation of a recovery of the MP bridge 21 will be described.

Figure 15:
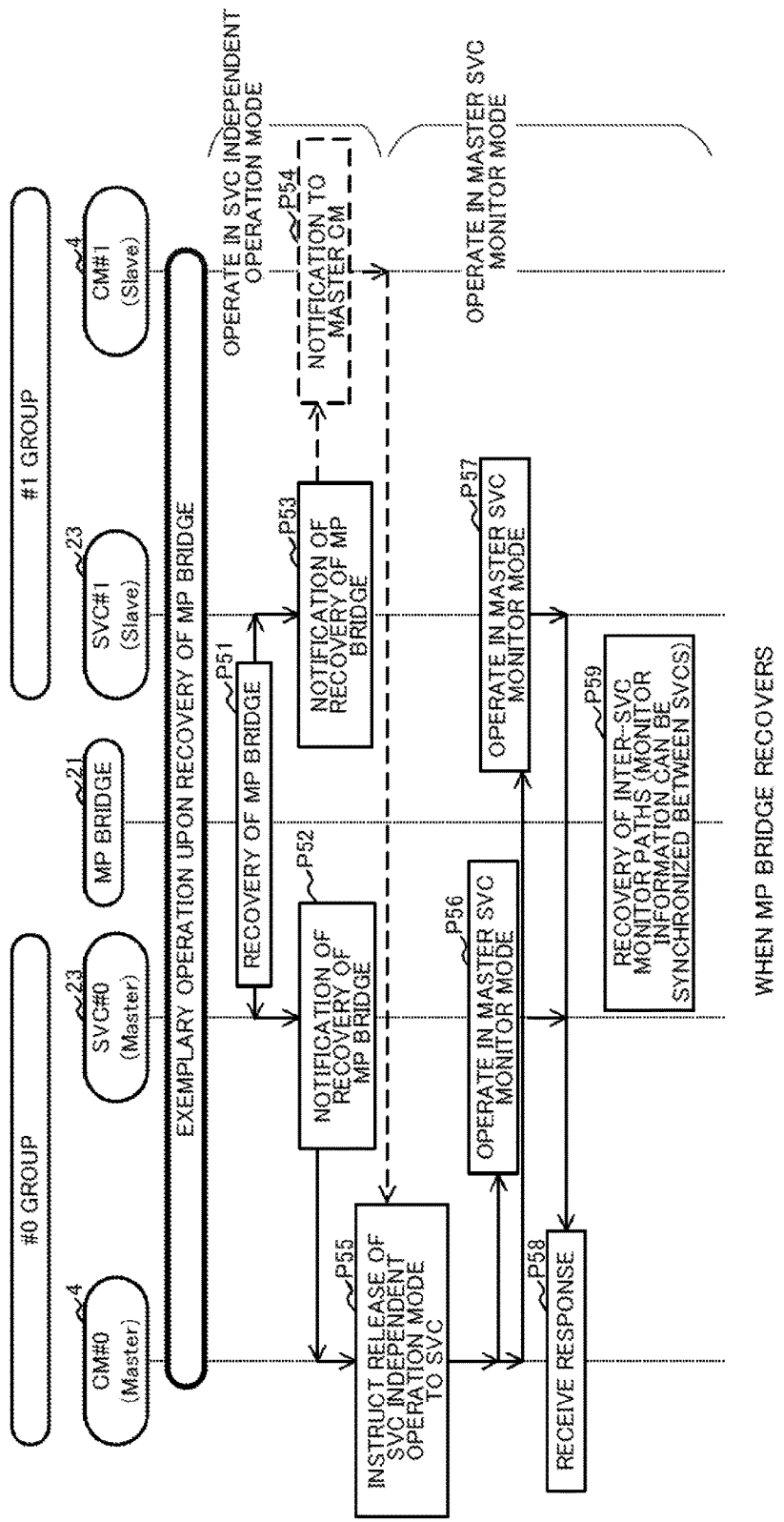
FIG. 15 is a flowchart illustrating exemplary operations of the storage apparatus when the MP bridge has recovered.

As exemplified in FIG. 15, in the SVC independent operation mode, when the failed MP bridge 21 recovers after a replacement (Process P51), each SVC 23 notifies the local-group CM 4 of the recovery of the MP bridge 21 (Processes P52 and P53).

The slave CM #1 that has been notified from the slave SVC #1 notifies the master CM #0 of the recovery of the MP bridge 21 (Process P54). Note that the slave SVC #1 may skip the notification in Process P53, or may skip Process P54 to make a notification to the master CM #0 using the cross line.

The master CM #0 that has been notified from the master SVC #0 (and the slave CM #1) instructs the master SVC #0 and the slave SVC #1 to release the SVC independent operation mode (Process P55). The operation mode switching units 41 in the master CM #0 and the slave CM #1 release the SVC independent operation mode and transition to the master SVC monitor mode.

The operation mode switching units 231 in the master SVC #0 and the slave SVC #1 release the SVC independent operation mode in response to the instruction from the master CM #0, and transition to the master SVC monitor mode (Processes P56 and P57). A response is transmitted to the master CM #0.

The master CM #0 receives a response from each SVC 23 (Process P58), and the monitor path between the SVCs 23 via the MP bridge 21 recovers (Process P59). This permits monitor information between the SVCs 23 to be synchronized.

(2) Miscellaneous

While a preferred embodiment of the present disclosure has been described in detail, the present disclosure is not limited to such a particular embodiment and may be practiced in a wide variety of modifications and alternatives without departing from the spirit thereof.

For example, the function blocks in the SVC 23 depicted in FIG. 4 and/or the function blocks in the CM 4 depicted in FIG. 8 may be combined in any combination or may be divided, respectively.

Furthermore, the numbers of MPs 20 in the relay apparatus 2, the FRTs 22 in an MP 20, and/or the CMs 4 in a CE 3 are not limited to two, and one or three or more of them may be provided. When three or more MPs 20 are provided in the relay apparatus 2, two or more MP bridges 21 may be provided.

In one aspect, the availability of a storage apparatus can be improved.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control apparatus for one of a plurality of control apparatuses that controls accesses to a plurality of storage devices, the control apparatus comprising:
a memory; and
a processor coupled to the memory, and the processor:
receives information on an abnormality in a relay apparatus comprising first and second monitor controllers provided in the relay apparatus that relays a communication among the plurality of control apparatuses, from the first monitor controller that manages first management information and execute a monitor of the relay apparatus, the abnormality being detected by the first monitor controller; and
when the received information about the abnormality is information on an abnormality of a bridge board that forms a first communication route between the first monitor controler and the second monitor controller that manages second management information and executes a monitor of the relay apparatus, executes a switching process for switching a communication route used to synchronize the first and second management information between the first monitor controller and the second monitor controller, from the first communication route via the bridge board, to a second communication route via communication lines connecting the control apparatus and either of the first and second monitor controllers.

2. The control apparatus according to claim 1, wherein the processor:
after the switching process, obtains the first and second management information from the first and second monitor controllers using the second communication route, respectively; and
executes the monitor based on the obtained first and second management information.

3. The control apparatus according to claim 1, wherein the processor:
when no abnormality arises in the bridge board, receives information on an abnormality detected by the second monitor controller via the first communication route and the first monitor controller, and after the switching process, receives the information on the abnormality detected by the second monitor controller from the second monitor controller via the second communication route.

4. The control apparatus according to claim 1, wherein the processor:
when no abnormality arises in the bridge board, transmits a control instruction to the second monitor controller via the first monitor controller and the first communication route, and after the switching process, transmits the control instruction to the second monitor controller to the second monitor controller via the second communication route.

5. The control apparatus according to claim 1, wherein the processor:
when information on a recovery of the bridge board is received from the first monitor controller, switches the communication route from the second communication route to the first communication route.

6. The control apparatus according to claim 1, wherein the processor:

when the received information about the abnormality is information on an abnormality of the bridge board and the second monitor controller, executes a stop process for stopping a storage apparatus comprising the plurality of control apparatuses and the relay apparatus.

7. The control apparatus according to claim 1, wherein the processor:
when the received information about the abnormality is information on an abnormality in at least one module of a first module group comprising a plurality of modules including the first monitor controller and a first connection unit that communicatively connects among the plurality of control apparatuses, and a second module group comprising a plurality of modules including the second monitor controller and a second connection unit that communicatively connects among the plurality of control apparatuses, executes a detachment process for detaching a site of the abnormality from the relay apparatus.

8. A storage apparatus comprising:
a plurality of control apparatuses that control accesses to a plurality of storage devices; and
a relay apparatus that relays a communication among the plurality of control apparatuses,
the relay apparatus comprises:
a first monitor controller that manages first management information and executes a monitor of the relay apparatus;
a second monitor controller that manages second management information and executes a monitor of the relay apparatus; and
a bridge board that forms a first communication route between the first monitor controller and the second monitor controller, and
one control apparatus of the plurality of control apparatuses executes a switching process for switching, when receiving information on an abnormality of the bridge board detected by the first monitor controller from the first monitor controller, a communication route used to synchronize the first and second management information between the first monitor controller and the second monitor controller, from the first communication route via the bridge board, to a second communication route via communication lines connecting the control apparatus and either of the first and second monitor controllers.

9. The storage apparatus according to claim 8, wherein the control apparatus:
after the switching process, obtains the first and second management information from the first and second monitor controllers using the second communication route, respectively; and
executes the monitor based on the obtained first and second management information.

10. The storage apparatus according to claim 8, wherein the control apparatus:
when no abnormality arises in the bridge board, executes at least one of a reception of information on an abnormality detected by the second monitor controller and a transmission of a control instruction to the second monitor controller, via the first monitor controller and the first communication route, and
after the switching process, executes at least one of a reception of the information on the abnormality detected by the second monitor controller and a transmission of the control instruction to the second monitor controller, via the second communication route.

11. The storage apparatus according to claim 8, wherein the control apparatus:
when information on a recovery of the bridge board is received from the first monitor controller, switches the communication route from the second communication route to the first communication route.

12. The storage apparatus according to claim 8, wherein the control apparatus:
when the received information about the abnormality is information on an abnormality of the bridge board and the second monitor controller, executes a stop process for stopping the storage apparatus.

13. The storage apparatus according to claim 8, wherein the relay apparatus comprises:
a first module group comprising a plurality of modules including the first monitor controller and a first connection unit that communicatively connects among the plurality of control apparatuses,
a second module group comprising a plurality of modules including the second monitor controller and a second connection unit that communicatively connects among the plurality of control apparatuses, the control apparatus:
when the received information about the abnormality is information on an abnormality in at least one module, executes a detachment process for detaching a site of the abnormality from the relay apparatus.

14. A non-transitory computer-readable recording medium having stored therein a control program for causing one of computers that control accesses to a plurality of storage devices, to execute the process comprising:
receiving information on an abnormality in a relay apparatus comprising first and second monitor controllers provided in a relay apparatus that relays a communication among the plurality of computers, from the first monitor that manages first management information and executes a monitor of the relay apparatus, the abnormality being detected by the first monitor controller; and
when the received information about the abnormality is information on an abnormality of a bridge board that forms a first communication route between the first monitor and the second monitor controller that manages second management information and executes a monitor of the relay apparatus, executing a switching process for switching a communication route used to synchronize the first and second management information between the first monitor controller and the second monitor controller, from the first communication route via the bridge board, to a second communication route via communication lines connecting the computer and either of the first and second monitor controllers.

15. The non-transitory computer-readable recording medium according claim 14, wherein the control program causes the one of the computers to execute the process comprising:
after the switching process, obtaining the first and second management information from the first and second monitor controllers using the second communication route, respectively; and
executing the monitor based on the obtained first and second management information.

16. The non-transitory computer-readable recording medium according claim 14, wherein the control program causes the one of the computers to execute the process comprising:
when no abnormality arises in the bridge board, executing at least one of a reception of information on an abnormality detected by the second monitor controller and a transmission of a control instruction to the second monitor controller, via the first monitor controller and the first communication route, and
after the switching process, executing at least one of a reception of the information on the abnormality detected by the second monitor controller and a transmission of the control instruction to the second monitor controller, via the second communication route.

17. The non-transitory computer-readable recording medium according claim 14, wherein the control program causes the one of the computers to execute the process comprising:
when information on a recovery of the bridge board is received from the first monitor controller, switching the communication route from the second communication route to the first communication route.

18. The non-transitory computer-readable recording medium according claim 14, wherein the control program causes the one of the computers to execute the process comprising:
when the received information about the abnormality is information on an abnormality of the bridge board and the second monitor controller, executing a stop process for stopping a storage apparatus comprising the plurality of computer and the relay apparatus.

19. The non-transitory computer-readable recording medium according claim 14, wherein the control program causes the one of the computers to execute the process comprising:
when the received information about the abnormality is information on an abnormality in at least one module of a first module group comprising a plurality of modules including the first monitor controller and a first connection unit that communicatively connects among the plurality of computers, and a second module group comprising a plurality of modules including the second monitor controller and a second connection unit that communicatively connects among the plurality of computers, executing a detachment process for detaching a site of the abnormality from the relay apparatus.

* * * * *